May 26, 1964 W. G. WELCHMAN 3,134,895
DATA PROCESSING APPARATUS
Filed June 23, 1960 16 Sheets-Sheet 1
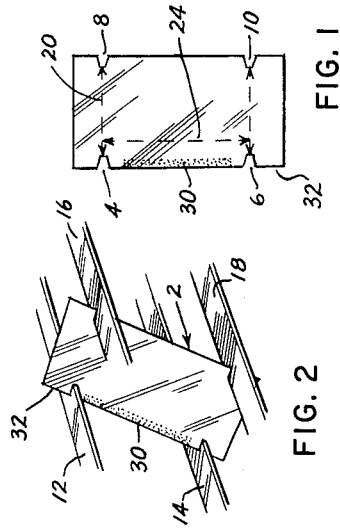
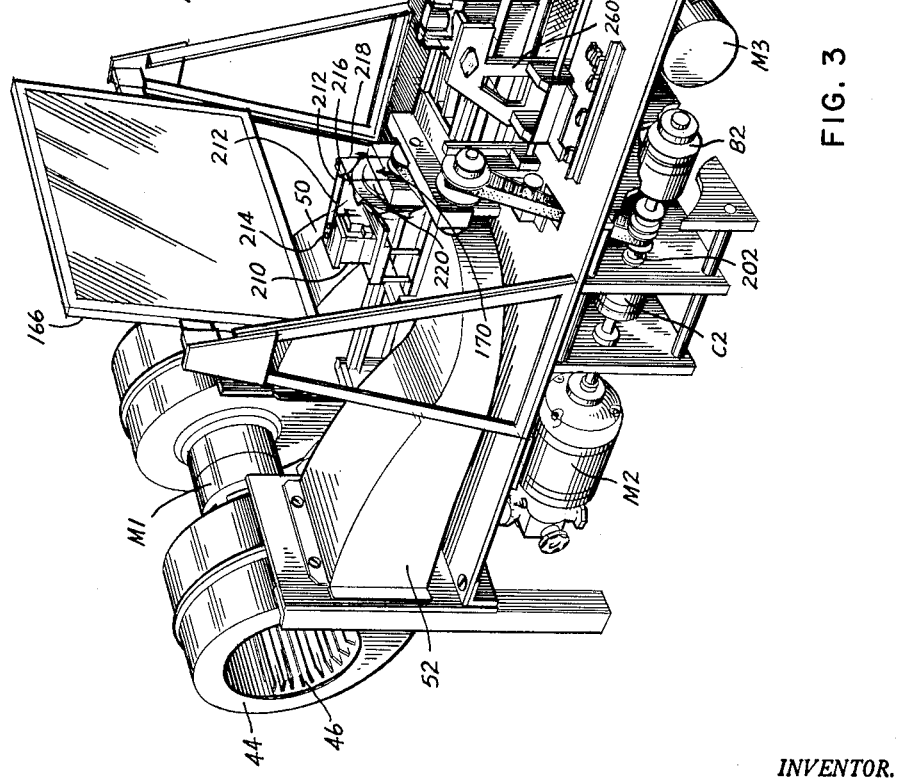
INVENTOR.
WILLIAM GORDON WELCHMAN May 26, 1964   W. G. WELCHMAN   3,134,895
DATA PROCESSING APPARATUS
Filed June 23, 1960   16 Sheets-Sheet 2

INVENTOR.
WILLIAM GORDON WELCHMAN
BY
Weingarten, Orenbuch & Pandiscio
Attorney

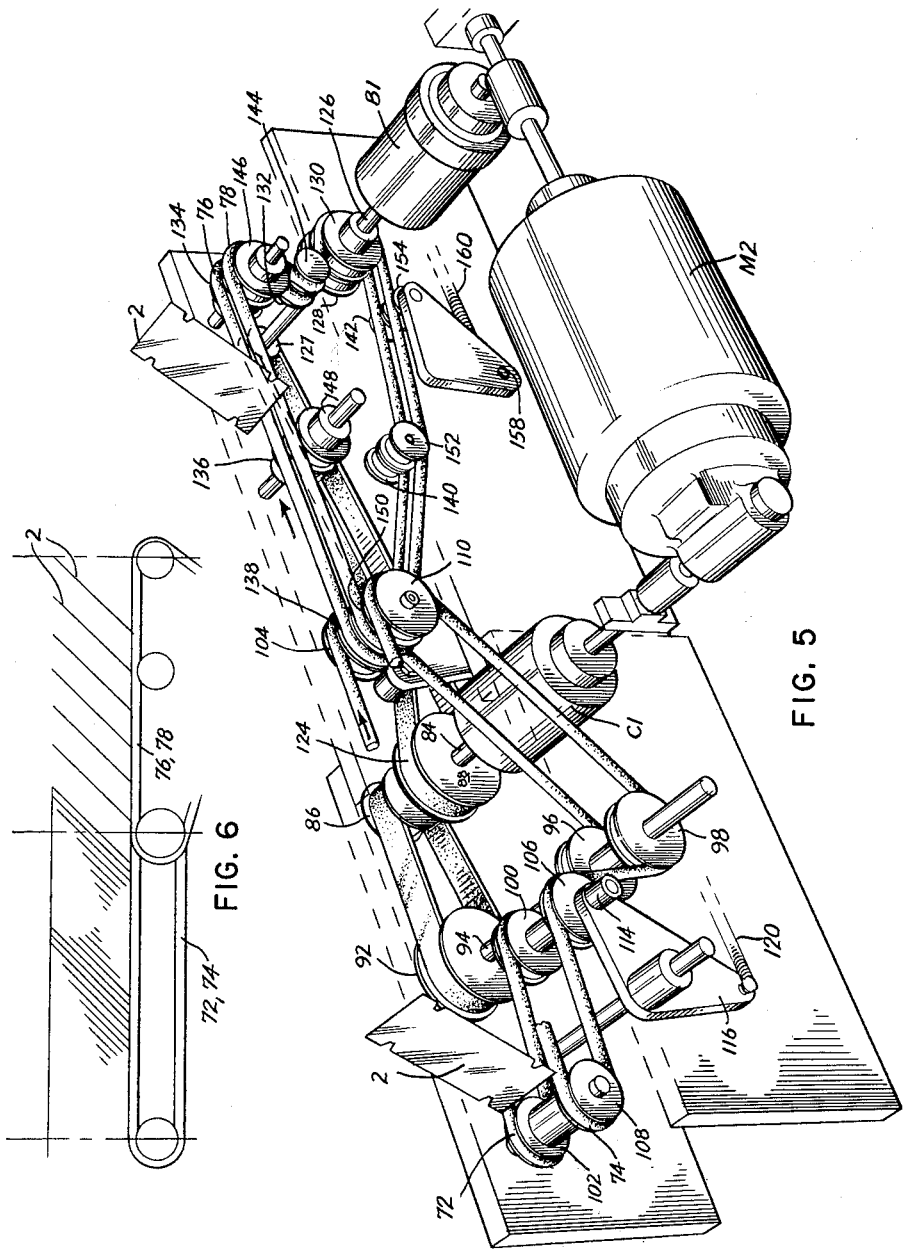

May 26, 1964
W. G. WELCHMAN
3,134,895
DATA PROCESSING APPARATUS
Filed June 23, 1960
16 Sheets-Sheet 4
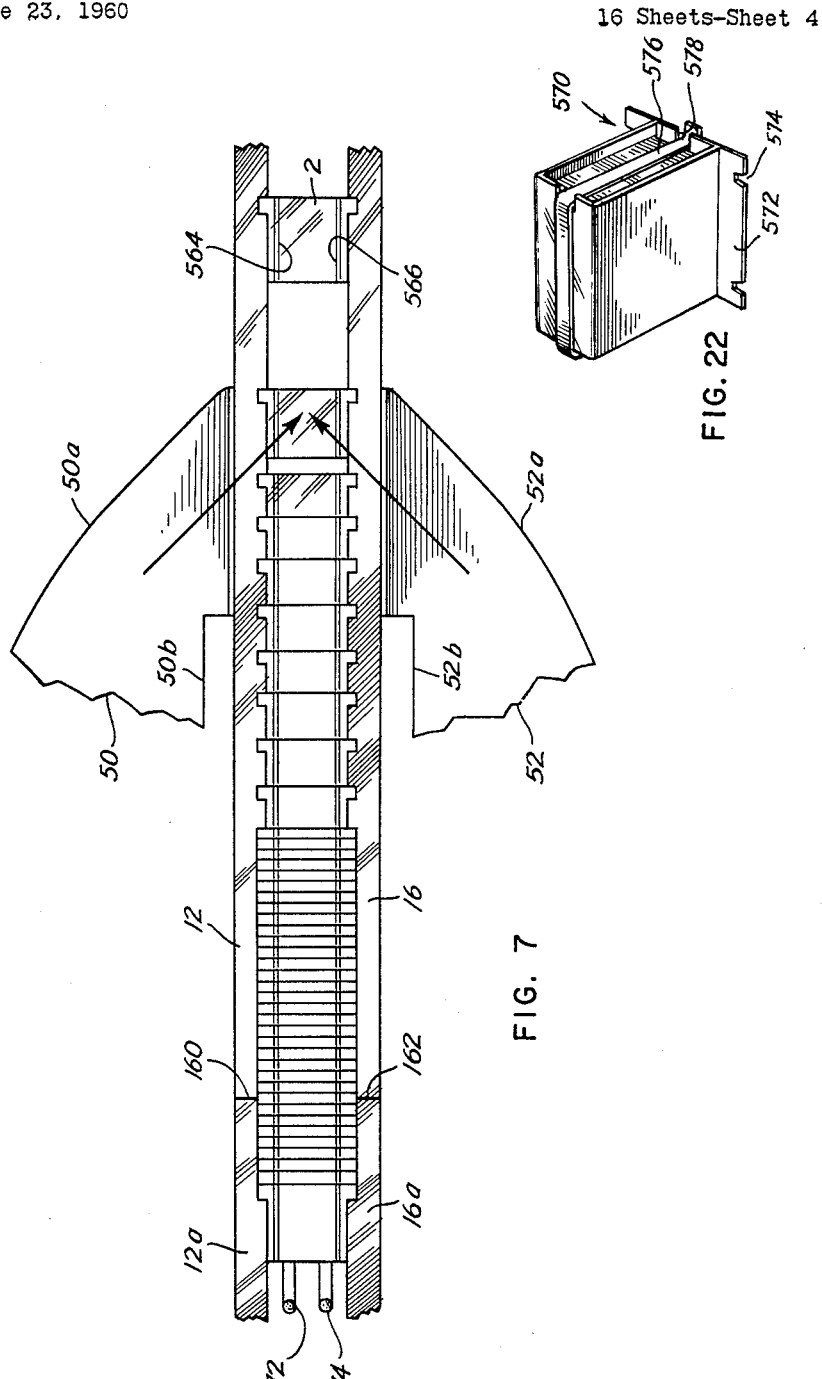
INVENTOR.
WILLIAM GORDON WELCHMAN May 26, 1964    W. G. WELCHMAN    3,134,895
DATA PROCESSING APPARATUS
Filed June 23, 1960    16 Sheets—Sheet 5

INVENTOR.
WILLIAM GORDON WELCHMAN

May 26, 1964 W. G. WELCHMAN 3,134,895
DATA PROCESSING APPARATUS
Filed June 23, 1960 16 Sheets-Sheet 6

INVENTOR.
WILLIAM GORDON WELCHMAN
BY
Weingarten, Ovenbuck & Pandiscio
Attorney

May 26, 1964 W. G. WELCHMAN 3,134,895
DATA PROCESSING APPARATUS
Filed June 23, 1960 16 Sheets-Sheet 8

INVENTOR.
WILLIAM GORDON WELCHMAN
BY

May 26, 1964   W. G. WELCHMAN   3,134,895
DATA PROCESSING APPARATUS
Filed June 23, 1960   16 Sheets-Sheet 9
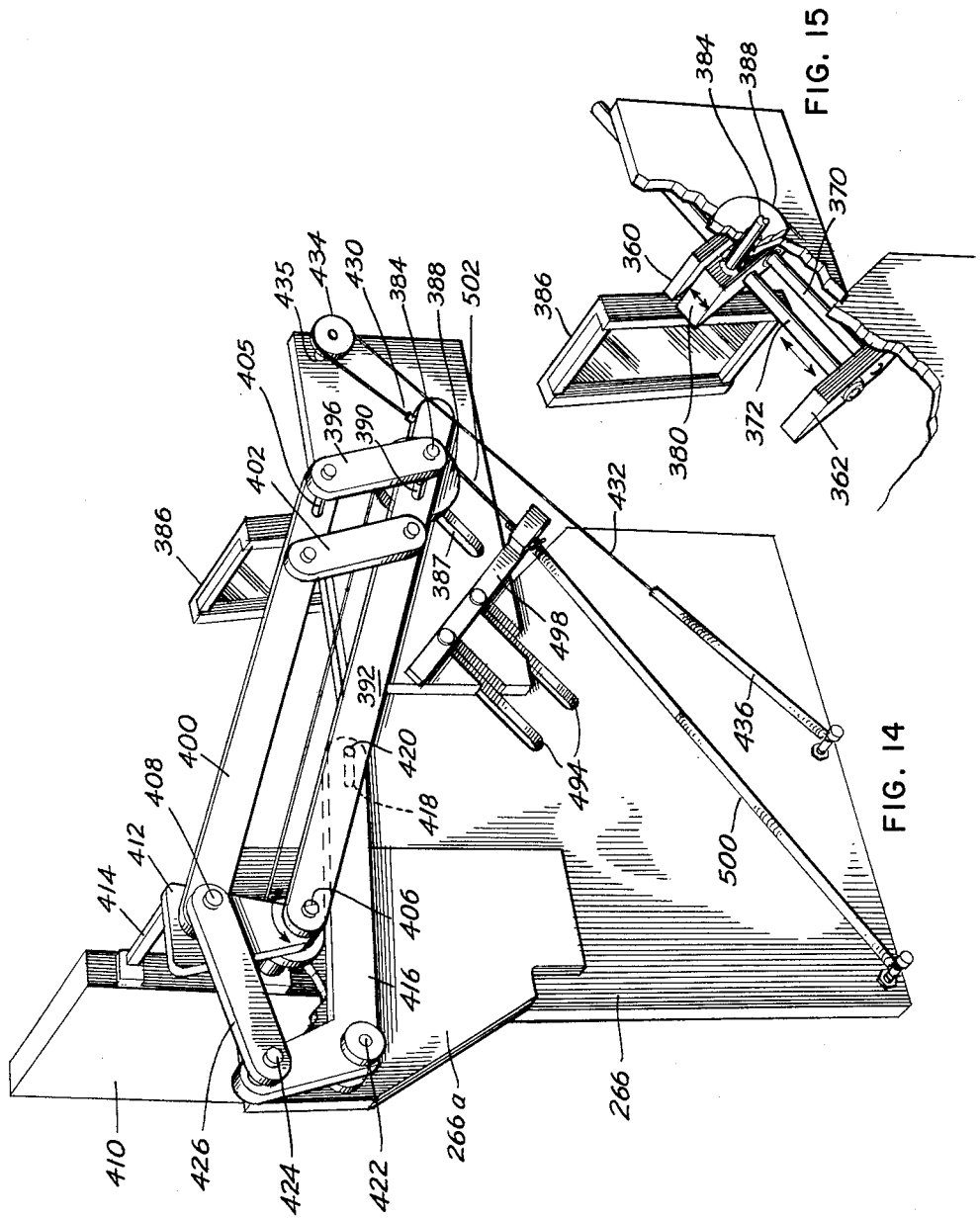
INVENTOR.
WILLIAM GORDON WELCHMAN

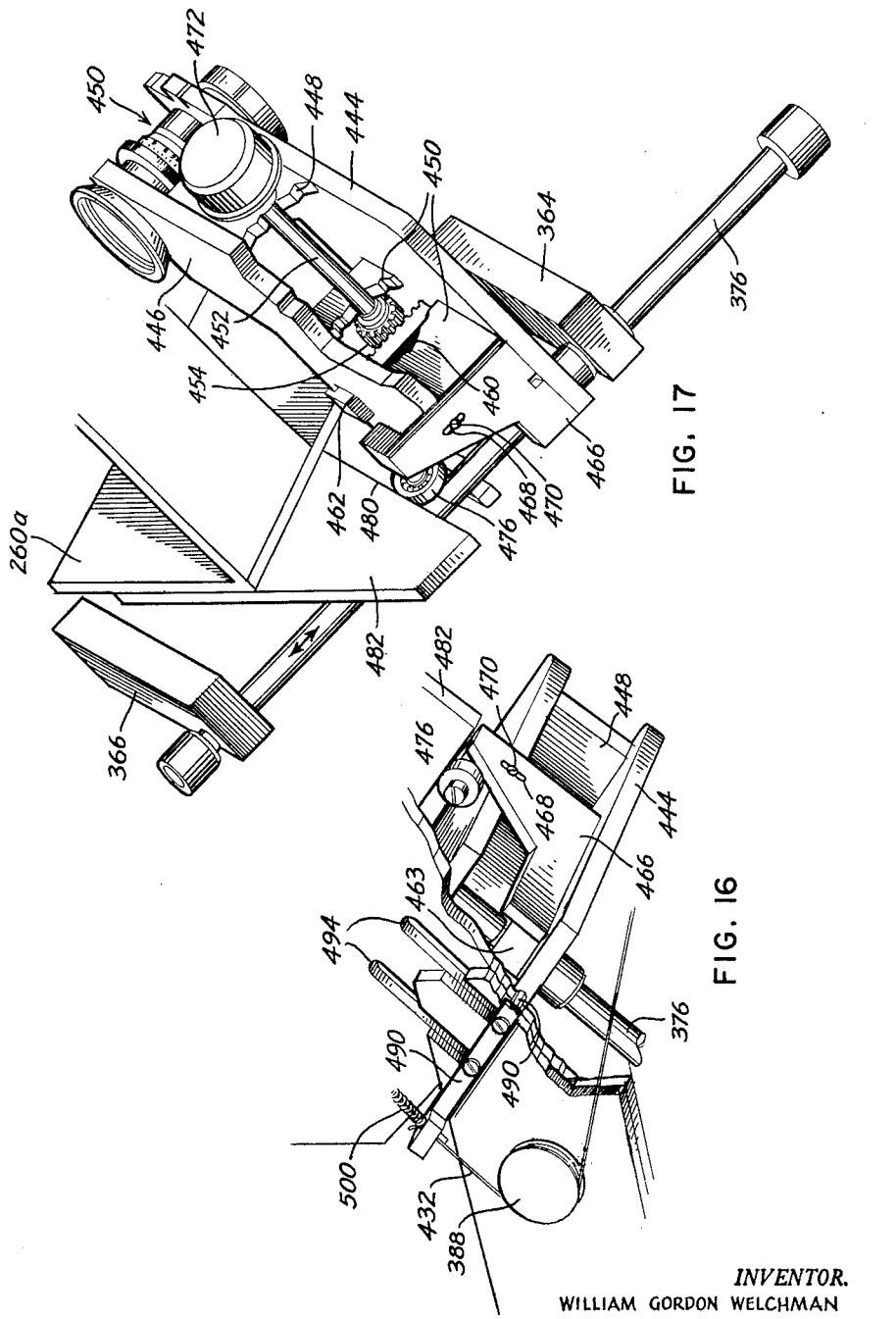

INVENTOR.
WILLIAM GORDON WELCHMAN

May 26, 1964 W. G. WELCHMAN 3,134,895
DATA PROCESSING APPARATUS
Filed June 23, 1960 16 Sheets-Sheet 13

INVENTOR.
WILLIAM GORDON WELCHMAN
BY

United States Patent Office 3,134,895
Patented May 26, 1964

3,134,895
DATA PROCESSING APPARATUS
William Gordon Welchman, Lexington, Mass., assignor to Itek Corporation, Waltham, Mass., a corporation of Delaware
Filed June 23, 1960, Ser. No. 38,334
7 Claims. (Cl. 235—61.11)

This invention relates to a data processing system and more particularly to a data processing system having means for pneumatically transporting and/or segregating a file of similar data bearing sheets, such as film chips, at a relatively high speed, whereby to facilitate locating and retrieving sheets having predetermined encoded information.

Heretofore, several different data processing systems have been devised which employ jets or streams of air for rapidly removing and/or segregating successive data bearing sheets such as film chips from a large storage pile so as to facilitate reading or reproduction of the data recorded on the sheets. However, prior pneumatic systems generally employed jets or streams of air to perform a flipping rather than a transporting function. The general schemes of prior pneumatic data processing devices embodied the idea of anchoring film chips to a movable support, such as a rotary drum or an elongated magazine or stick. The movable support carried the film chips past a sensing stage where a transducer was located to read a code carried by each chip. Cooperating with the movable support would be a jet or stream of air directed at the stack of chips. The jet of air would be so arranged as to blow or flip each chip past the transducer or reading head. In effect, the air jets functioned to segregate each chip for a short interval of time from the remaining chips so that each chip could be individually inspected by the transducer. Having detected a chip having a desired code, additional means would be brought into play to stop the chip and to project its information onto a screen for viewing.

These prior schemes have certain limitations. First of all, in the case of a rotating drum, the speed at which the chips moved past the sensing head was such that a chip having the desired information could not be stopped at the desired spot for viewing, but would overtravel. The overtravel would be so great that in many cases a relatively large number of additional chips would travel past the sensing stage and collect on top or in back of the desired chip. Consequently, a back-tracking mechanism was required to backtrack the additional chips so as to isolate the desired chip for viewing or reproduction. Naturally, this comparatively slow isolation run was done at the expense of the overall speed of the machine. Another limitation of these prior schemes is due to the fact that the chips were anchored; this made it difficult to extract a chip from the system. Still another limitation of these prior pneumatic-type data processing systems is that it was impossible to classify an existing file of the chips so as to obtain one or more groups of selected chips. Still a further limitation of these prior systems is that they could handle only a limited number of chips. This is particularly true in the case of a rotating drum. Still a further limitation of these prior systems is that they were not equally adaptable to handling different kinds of data bearing entities.

The chief object of the present invention is to provide a pneumatic-type data processing system which is free of the limitations and disadvantages attendant to prior data-processing systems of the same type and which has the additional advantage of permitting the data bearing sheets to be isolated and viewed while still wholly within the system or of allowing the individual data bearing sheets to be extracted from the system for subsequent utilization or reproduction of the recorded data. In the practice of this invention it is contemplated that the data bearing entity may be in the form of sheets of film, paper, metal, or plastic with each sheet carrying recorded data plus a code, magnetic or optical, for distinguishing it from like data bearing entities.

Another primary object of the present invention is to provide a data processing system wherein a plurality of data bearing sheets such as film chips are transported pneumatically in succession along a guide rail system, and further wherein means are provided for separating the sheets as they travel along the guide rail system whereby they may be individually scanned by a sensing unit in order to determine whether any of them carries predetermined coded information, whereby means may be actuated by the sensing system for segregating each sheet having the desired coded information. It is contemplated that the segregated sheets may be individually viewed or projected without extraction from the system, or, if desired, wholly extracted from the system for further utilization.

Preferably each data-bearing sheet is provided with a magnetically recorded binary-type code along or adjacent to one edge and a sensing unit is provided for sensing or reading the code on each sheet as the sheet passes a given point. For coding purposes each sheet is provided with a magnetically codable striping. Such stripings are well known to persons skilled in the art. Preferably, also the sensing unit is a multi-channel reading head, although one single channel reading head may be employed for a limited code. Similarly, it is possible to use several single channel reading heads mounted in series but disposed to read different channels.

Still another specific object of the present invention is to provide a data processing system embodying novel means for transporting film chips pneumatically whereby the film chips may be made to move along a predetermined path at a relatively high speed, additional means being provided for stopping the flow of chips along said path when a selected chip is to be separately utilized.

Another object of this invention is to provide a data processing system adapted to handle data-bearing sheets wherein means are provided for subjecting the sheets to a fluid pressure gradient whereby they will be transported along a guide rail system, and further wherein the sheets may be classified and/or retrieved according to a predetermined program. The illustrated embodiment uses a four-rail guide system wherein the four guide rails are arranged so as not to interfere with the data-reading transducer, and special means are provided to separate and space successive data bearing sheets so that they may be pneumatically transported past the transducer at high speeds in single file fashion.

Cooperating with the transducer is a logic coincidence system which receives the signals produced by the transducer in response to sheet designation codes on the sheets and compares said signals with program signals to produce an output control signal which is used to control mechanisms which effect utilization or disposition of those sheets having selected designation codes.

Other objects and many of the attendant advantages and features of the present invention will become better understod from the following detailed description when read in conjunction with the accompanying drawings wherein:

FIG. 1 is a front view of a film chip especially designed for use in the present invention;

FIG. 2 is a perspective view showing a film chip mounted on a guide rail system according to the present invention;

FIG. 3 is a perspective view of a machine embodying the data processing system of the present invention, certain elements of the optical projection system being omitted for clarity;

FIG. 5 is a perspective view showing details of the slow and high speed belt system;

FIG. 6 is a schematic view illustrating how the film chips are spaced from one another as they are transferred from the slow feed belts to the fast feed belts;

FIG. 7 is a schematic plan view illustrating how the spacing of the film chips is changed as they pass from the slow feed belts to the fast feed belts and from the fast feed belts into the air stream established by the twin air duct system;

FIG. 13 is a fragmentary perspective view illustrating the mechanism for supporting a trapped film chip so that the latter will be in position to be projected;

FIG. 14 is a perspective view of the mechanical linkage associated with the projecting system but mounted on the rear panel of the machine;

FIG. 15 is a perspective view showing additional elements of the projection system;

FIG. 16 is another perspective view showing still other elements of the projection system;

FIG. 17 is a perspective view illustrating how the lens system may be manually adjusted to obtain proper focusing;

FIG. 22 illustrates a novel container-type data-bearing element.

Figure 2A:
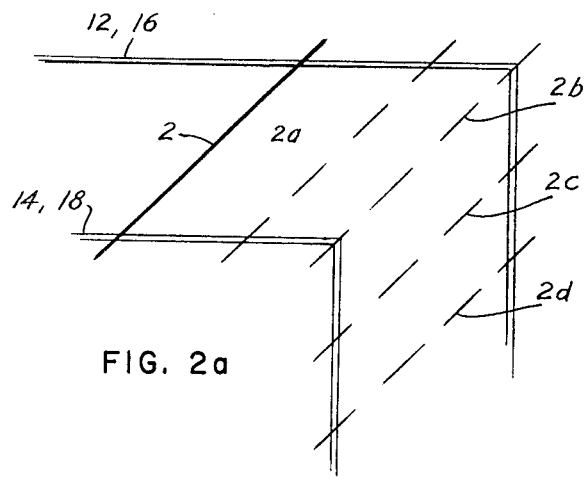
FIG. 2A is a schematic view illustrating how a film chip can negotiate a right angle turn in the guide rail system.

In its general organization a data processing system embodying the principles of the present invention utilizes a rectangular data-bearing sheet 2 which is provided with notches 4, 6, 8, and 10 which are sized to accommodate four guide rails 12, 14, 16, and 18, respectively. The width of the channel defined by the four rails, that is, the distance between rails 12 and 16, very closely approximates the width 20 of the data-bearing sheet, the former being only slightly greater than the latter. The width 20 is the distance between notches 4 and 8 or notches 6 and 10. However, the height of the four rail system, measured between rails 12 and 14 or rails 16 and 18, is substantially less than the height 24 of the data-bearing chip, the height 24 being measured between the notches 4 and 6 or the notches 8 and 10. Due to this difference in height, the chip can fit on all four rails simultaneously only if it is made to assume an oblique or tilted position.

Figure 4:
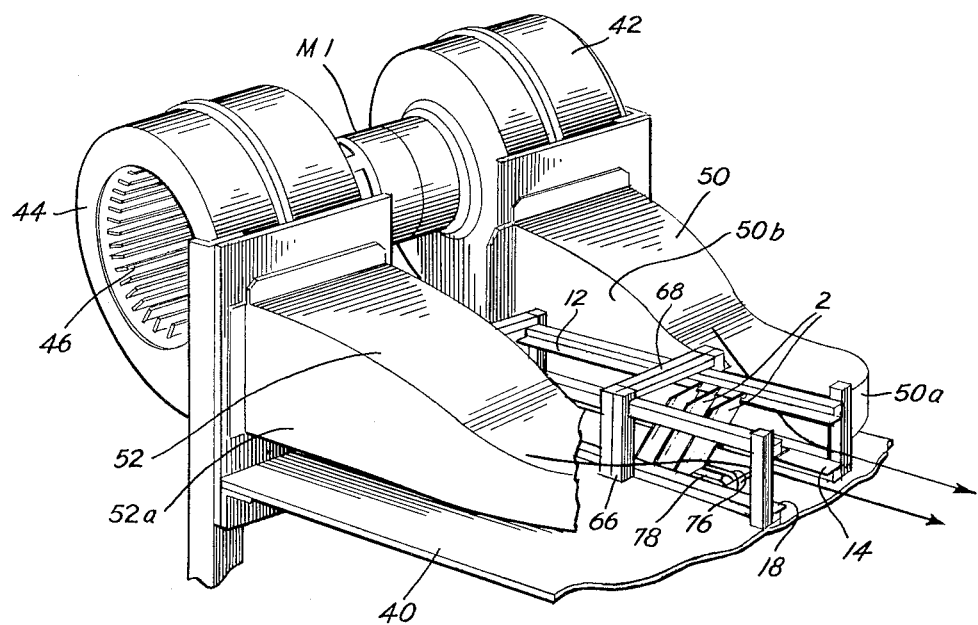
FIG. 4 is a fragmentary perspective view similar to part of FIG. 1 which illustrates how the film chips are fed toward the outlets of the twin air duct system.
Figures 8, 9:
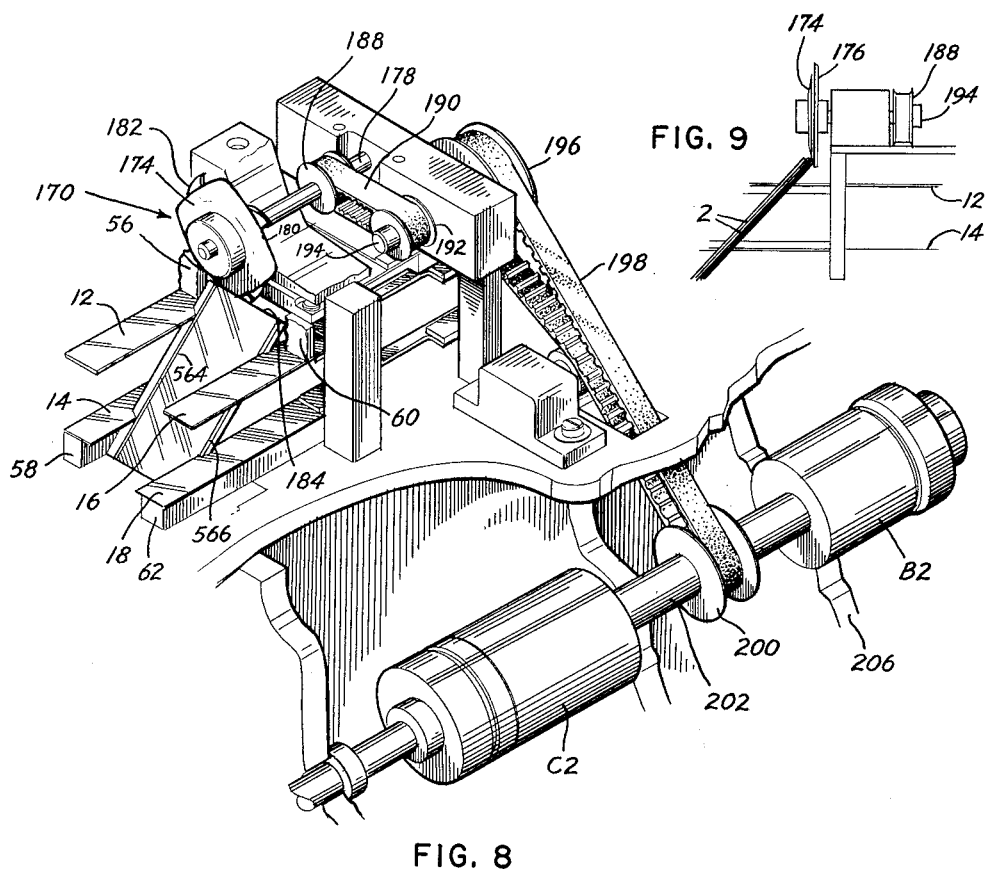
FIG. 8 is a perspective view showing details of the film chip release mechanism.
FIG. 9 is a side view in elevation illustrating how the film chips tend to accumulate at the release mechanism.

This tilted position is indicated in perspective in FIGS. 2 and 4 and is also indicated in profile in other figures, as, for example, FIGS. 6 and 9.

With data-bearing sheets mounted on a four rail system as indicated in FIG. 3, it is possible to transport or propel them at high speeds along the rails using simply a stream of air generated from a suitable source of air pressure. If a stream of air is directed at one side of a data-bearing sheet 2 when the latter is mounted on rails as illustrated in FIG. 2, the sheet will be moved, i.e. pushed, along the rails at a high speed. The weight of a typical data-bearing sheet and the friction between the sheet and the four rails when the data-bearing sheet is in motion are both relatively small; as a result, a relatively small air pressure gradient is required to be established along the rails in order to transport the sheet from one point to another. It has been determined that the four rails need not be enclosed in a tube or similar container so as to avoid leakage of air. Using an open four rails system as indicated in FIG. 3, velocities of an order of magnitude of 100 to 700" per second have been achieved with relatively small air pressure magnitudes.

It has also been determined that the fit between the notches and the rails is not critical. Preferably, however, there should be little play between the sheets and the rails.

It is to be noted also that a data-bearing sheet may be inclined with its top end leading its bottom end or with its top end trailing its bottom end. This means that the data-bearing sheets may be propelled equally well in both directions.

An unusual feature of a four rail system for handling data-bearing sheets is that the data-bearing sheets can be made to turn a right-angled corner. The one requirement is that the data-bearing sheet be disposed so that its leading end traverses the corner on the outside rails and its trailing end traverses the corner on the inside rails. Thus, if a sheet is traveling along four horizontal rails with its top end leading, the right angle turn must be down instead of up. In other words, the corner must be such that the top leading end of the sheet will travel through a greater distance than its bottom end in rounding the corner. The remarkable thing about this is that the data-bearing sheet reverses its angular position as it turns the corner. Thus, after the data-bearing sheet has rounded the corner, its top end will be trailing its bottom end. This is shown in FIG. 2A where the dotted lines 2a, 2b, 2c, and 2d illustrate successive positions of a sheet 2, traveling in the direction indicated by the arrow.

A delightful result of this reversal is that a data-bearing sheet can be made to travel in the opposite direction if the original air stream is discontinued and a new oppositely flowing air stream is introduced. The data-bearing sheet will readily negotiate the corner in the opposite direction since, thanks to the aforementioned reversal, its top end will be leading its bottom end in the reverse path.

Obviously, if a data-bearing sheet can be made to turn a right-angled corner, it can be made to turn other corners also.

Of course, in order to sort or classify a plurality of data-bearing sheets, it is necessary that these sheets be provided with identification means whereby they may be distinguished one from the other and further whereby an electrical signal output may be produced for actuating means for permitting or accomplishing suitable utilization of the data on the selected sheet. The encoded identifying information may be magnetic or optical. In the illustrated embodiment of the invention the data-bearing sheets are film chips which have been severed from a roll of exposed photographic film having a ferric-oxide magnetic striping 30 (see FIG. 2) on the base side of the film near one of its edges. In this case the magnetic striping 30 is adjacent a longitudinal edge 32 which is the edge which is nearest to the magnetic sensing head hereinafter referred to and described.

The properties of the striping 30 permit coding of each film chip 2 by transverse magnetization of segments, each segment representing a single bit of a code with the various patterns of magnetization being different for individual chips. It has been feasible to employ 16 mm. film severed into lengths of approximately two inches. However, the width and length of the film chip is not critical. Thus, for example, 8 mm. film or 35 mm. film may be used equally well. Similarly, the length of the film chip may be larger or smaller, depending upon the requirements of the system with which the film chip is intended to be used. With each chip having a plurality of bits of a code recorded therein, it is preferred to utilize a magnetic transducer sensing unit having a plurality of reading heads per inch so as to permit a chip to have a large number of code bits recorded therein. A typical transducer sensing unit which has been employed is one having fourteen reading heads per inch which permits a two-inch chip to have up to approximately twenty code bits. This yields $2^{20}$ possible combinations, if a single ferric-oxide stripe 30 is used.

Although in the illustrated embodiment hereinafter described only a single multi-channel sensing unit is employed, it is a characteristic of the present invention that several sensing units may be used, these sensing units being provided at various points along the guide rail network. Each sensing unit could be designed to read a specific number of bits on each film chip. In this manner, the size of each sensing unit could be reduced if the size was critical.

Turning now to FIG. 3, there is illustrated a machine embodying the principals of the present invention. For simplicity of illustration, part of the projection system has been omitted from FIG. 3. However, other figures illustrate all of the significant details of the projection system. At this point, it is to be understood that it is not necessary that a projection system be utilized in the practice of the present invention. Thus, for example, where film chips having the desired data are discovered in sorting through a file, means may be provided for extracting the film chips from the guide rail network for utilization outside of the system.

Figure 20:
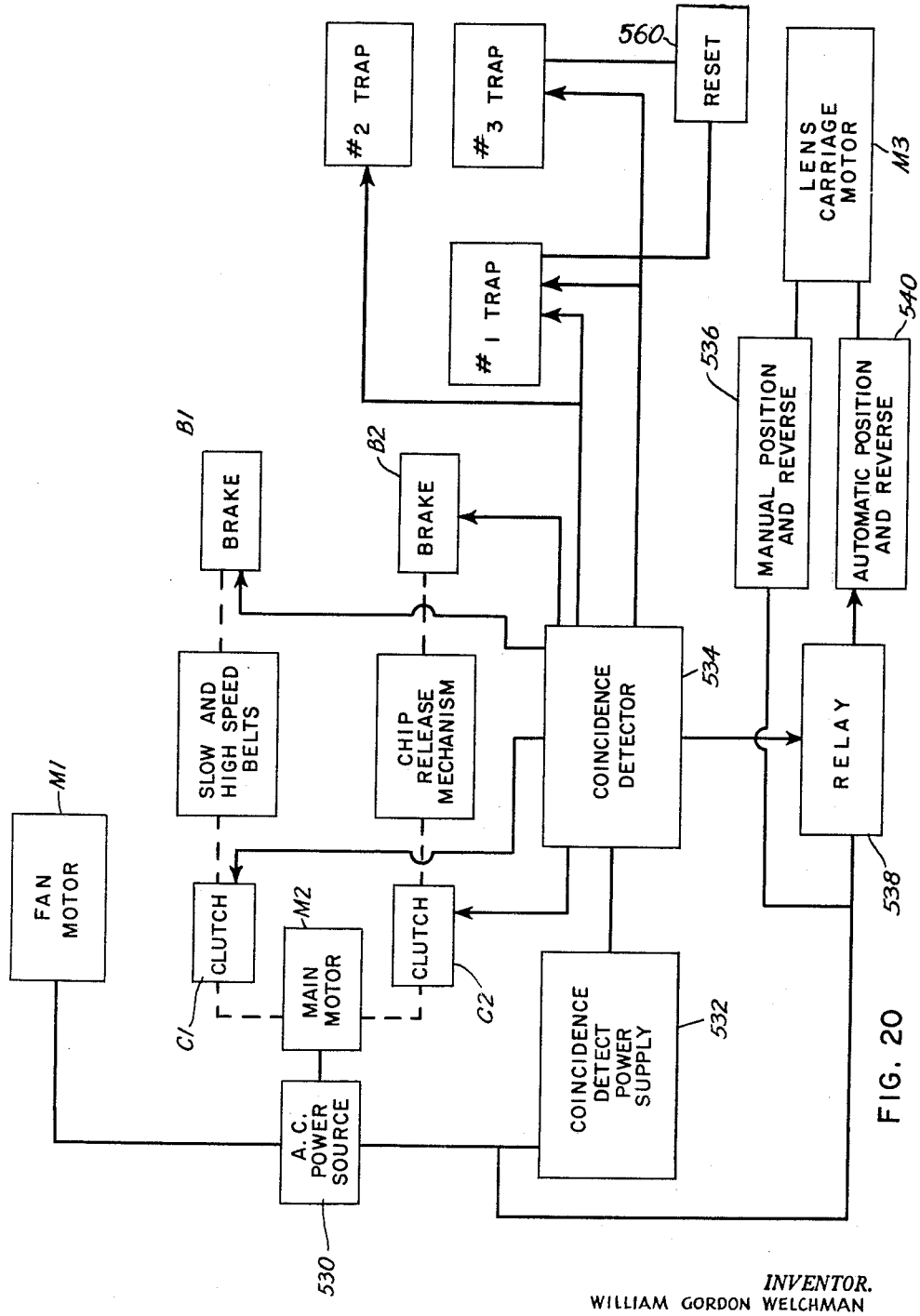
FIG. 20 is a block diagram of the electrical system of the apparatus of FIG. 3.
Figure 21:
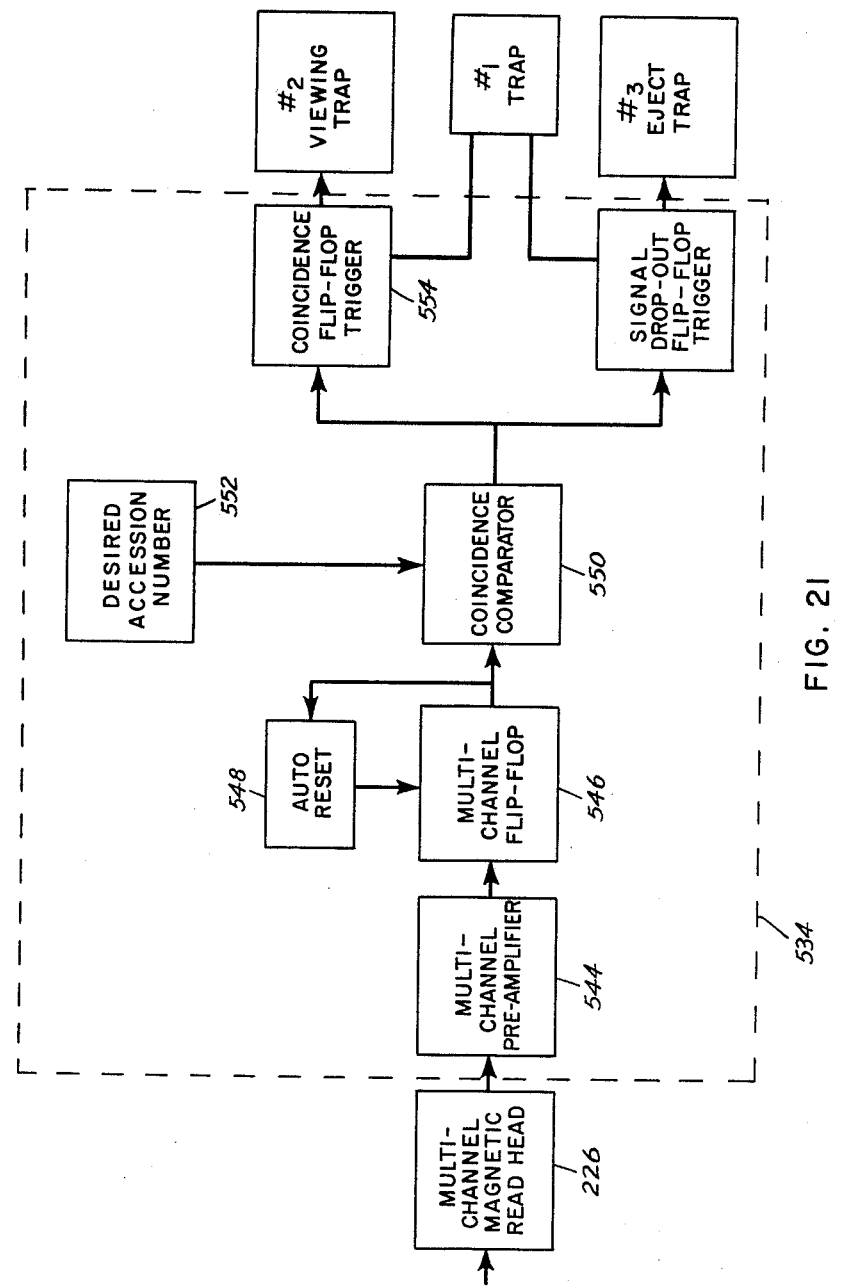
FIG. 21 is a block diagram showing the components of the coincidence detector circuit which is employed in the electrical system illustrated in FIG. 20.

The illustrated machine comprises a flat horizontal supporting table 40 which carries all of the components of the machine, including the control and data processing circuitry illustrated diagrammatically in FIGS. 20 and 21.

Mounted at one end of the table 40 is a pair of air blowers 42 and 44 having revolving vanes 46 which are driven by a common fan motor M1. The two fans 42 and 44 are connected in series with two ducts 50 and 52, respectively, which curve inwardly at approximately the same point to form an air junction with a four rail system generally identified by numeral 54. As illustrated in FIGS. 3, 4, 8, 10, and 19, the four rail system consists of thin rails 12, 14, 16, and 18 which are supported by horizontal members 56, 58, 60, and 62, respectively. The latter are held in fixed relation to reach other by a plurality of upstanding posts 66 and horizontal cross-members 68. It is to be noted that the rails 12, 14, 16, and 18 extend inwardly from the supporting horizontal members 56, 58, 60, and 62, by an amount sufficient so that the outside edges of the film chips will be spaced from the inside edges of members 56, 58, 60, and 62. In this way, the structure supporting the four rails presents no obstacle to free movement of the film chips along the rails.

The two ducts 50 and 52 curve inwardly toward the four rails in such a manner that the air flowing along to their outside walls 50a and 52a, respectively, enters the four rail system at an angle approximately 45° to the axis thereof. On the other hand, air flowing along next to the inner walls 50b and 52b (FIGS. 4 and 7), of the ducts enters the four rail system at an angle approximately perpendicular to the axis of the rail system. As a result, there is a slight back pressure created in the channel defined by the four rails upstream of the duct outlets, whereas on the downstream side of the duct outlets, the air streams from the two ducts produce a resultant air stream which is directed along the axis of the four rail system away from the fans. Due to the different angles at which air from the two ducts enters the four rail system, it appears that there is a definite change in air pressure and direction of air flow in the channel in the region of the outlets of the two ducts. The rapid change in pressure appears to be at approximately the midpoint of the two outlets. As a consequence, if film chips are advanced at a constant rate along the rails from the direction of the fans towards the outlet ends of the two ducts, they will continue to move at this constant speed until they reach approximately the midpoint of the two duct outlets. At this point, the leading film chip will suddenly be propelled forward due to the change in air pressure and direction of air flow. In effect, therefore, the noticeable change in air pressure and direction of air flow occurring about halfway along the zone in the channel between the two duct outlets, functions to space the film chips. This spacing is similar to the spacing which results when particles are transferred from a first conveyor traveling at a constant relatively low speed onto a second conveyor traveling at a constant relatively high speed. The difference is in the speed at which the film chips are propelled by the air stream. This speed is substantially in excess of the speeds which are achievable with belts.

As seen in FIGS. 5, 6, and 7, and also to a limited extent in FIG. 4, the machine includes a pair of low speed belts 72 and 74 and a pair of high speed belts 76 and 78. Belts 72 and 74 are mounted on a pulley system which is driven from a main motor M2.

The motor M2 has an output shaft 82 which is connected through an electromagnetic clutch C1 to a main shaft 84 which carries two main drive pulleys 86 and 88. Pulley 86 drives a belt 90 which, in turn, drives a pulley 92 mounted on a shaft 94. Shaft 94 drives two pulleys 96 and 98 which drive belts 72 and 74. It is to be noted that belt 72 travels in turn about drive pulley 96, a take-up pulley 100, and two guide pulleys 102 and 104. Similarly, belt 74 travels about drive pulley 98, a take-up pulley 106, and two guide pulleys 108 and 110. The two take-up pulleys 100 and 106 are mounted on a common shaft 114 which is carried by an arm 116 that is mounted for pivoting on a shaft 118. A tension spring 120 urges arm 116 in a direction to keep the take-up pulleys 100 and 106 in firm engagement with the belts 72 and 74 so as to substantially eliminate any slack in these belts.

The main drive pulley 88 drives a belt 124 which drives a shaft 126 through a small pulley 127 that is mounted on the end of a shaft 126. Shaft 126 is coupled to an electromagnetic brake B1 whose housing is stationary. Also mounted on shaft 128 are two drive pulleys 128 and 130 over which ride the two belts 76 and 78, respectively. These belts also ride in turn over a plurality of idler pulleys. Belt 76 rides on idler pulleys 132, 134, 136, 138, and 140. Also, belt 76 rides on a take-up pulley 142. Belt 78 rides about the aforementioned pulley 130 and also over guide pulleys 144, 146, 148, 150, and 152. Belt 78 also rides over a second take-up pulley 154. The two take-up pulleys, 142 and 154, are mounted on a common shaft which is attached to an arm 156 which is pivotally mounted at 158. A tension spring 160 acts on arm 156 to maintain the two take-up pulleys 142 and 154 in tight engagement with the belts 76 and 78, thereby to eliminate any slack in the latter.

The ratios between the pulleys of the two conveyor belt systems, e.g. between pulleys 86 and 88, are such that when motor M2 is energized, the two belts 72 and 74 will be driven at a speed which is substantially lower than the speed at which the two belts 76 and 78 are driven. It is to be noted that the two pairs of belts will be driven from the motor M2 only so long as the clutch C1 is engaged. The clutch C1 is engaged only when energized. At the same time it is to be noted that if the clutch is disengaged, the belts will tend to continue traveling in the same direction. However, if at the same moment that the cluch C1 is disengaged, the brake B1 is engaged, the belts will be halted immediately so as to have little or no over-travel. Brake B1 is engaged only when de-energized. Of course, clutch C1 and brake B1 are of conventional construction, and may be replaced by suitable equivalent clutching and braking devices.

FIG. 7 illustrates how the film chips are acted upon by the belt delivery system and the air feed system. As seen in FIG. 7, the chips are generally stacked close together. Although not shown in detail, it is to be understood that the chips are assembled in a removable magazine R having rails which will be in alignment with the rails 12, 14, 16, and 18 when the magazine is in place.

In FIG. 7, numerals 12a and 16a designate sections of the top rails of a removable magazine R. The top rails 12a and 16a and the bottom rails (not shown) abut the adjacent ends of tracks 12–18 as indicated at 160 and 162. Since the magazine will have an open bottom, the bottom edges of the film chips contained therein will be exposed to and engaged by the slow speed belts 72 and 74. Assuming (1) that a stack of closely packed chips has been placed over the belts 72 and 74 by means of a suitable magazine, (2) that motor M2 is operating, and (3) that clutch C1 is now engaged, the chips will be transported forward by belts 72 and 74 with little or no spacing occurring between them. However, as soon as the chips are transferred onto the belts 76 and 78, they immediately become spaced apart. The degree of spacing is determined by the difference in relative speed between belts 76, 78 and belts 72, 74. Preferably, this initial spacing is of the order of an inch. However it may be more or less without departing from the principles of the present invention. This initial spacing is maintained by the chips as they enter the region between the outlets of ducts 50 and 52. In this connection, it is to be noted (as seen in FIG. 4) that the fast feed belts 76 and 78 extend into the region between the outlets of the two air ducts and terminate, i.e. reverse direction, approximately at the midpoint of the outlets of the two ducts. Consequently, the chips will continue advancing into the aforementioned region even though the air flow adjacent to walls 50b and 52b tends to establish a back pressure in the upstream end of said region. The back pressure is not sufficient to drive the chips backward in opposition to the drag exerted by belts 76 and 78. The chips will retain their initial spacing until they reach approximately the midpoint of the duct outlets, at which point there is a sharp change in pressure, as pointed out previously. As soon as the chips are subjected to this relatively high forward air pressure, they take off and literally zoom down the rails at speeds in the neighborhood of 100 to 700 inches per second. In a typical installation this meant that the chips were fed along at the rate of 50 chips per second or approximately 3,000 per minute.

The illustrated machine is designed to project the data recorded on a selected chip onto a suitable screen, such as the projection screen 166 illustrated in FIG. 3. In the instant apparatus this is accomplished without removing the selected film chip from the system. In order to project this data onto the screen 166, it is necessary that some means be provided for halting the selected film chip in order that its data may be projected. Furthermore, some means must be provided for stopping all chips upstream of the selected chip until the selected chip data has been projected and read or otherwise utilized.

Accordingly, reference is now had to FIGS. 3, 8, and 9 in order to observe a chip releasing mechanism generally indicated by the numeral 170. This mechanism comprises a pair of discs, a sheet separation disc 174 and a sheet releasing disc 176, both of which are securely fastened to a rotatable shaft 178 which is mounted above the four rails in parallel relation to the center line of the rectangular channel defined by these four rails. Sheet separation disc 174 is essentially four-sided in configuration and comprises four equally spaced points 180. The edge of sheet release disc 176 is so shaped as to provide four equally spaced sawtooth shaped points 182 which are arranged in alternately occurring relation with the sharp points 180 of the separation disc 174. It is to be noted that the thickness of disc 174 decreases progressively towards its edge. At its edge the disc 174 has a very small thickness, comparable to a knife edge. Although not shown to be so, the sharp points 182 of the release disc 176 may also have a gradually decreasing thickness, terminating at a knife edge. The direction of rotation of discs 174 and 176 is clockwise in FIG. 8.

In practice, the discs 174 and 176 are rotated at a speed sufficiently high to pass chips as fast as they arrive. However, in the following description of the mode of operation of the discs, it is assumed for convenience of description that the discs are rotating at a much lower speed. Accordingly, film chips which have been transported from the infeed section by the air stream will tend to accumulate against the release disc 176. The top edge of the film chip, it follows that first film chip is supported by the level which is just above the level of the points 180 and 182 of the two discs when in six o'clock position. Thus, as the film chips travel down the rails, they will tend to accumulate on the upstream side of the discs. They are retained there by the air pressure gradient. Assume that at a given instant a first chip is leaning against a point 182 of disc 176. Since the points 182 of release disc 176 are the only parts of the disc which can engage the film chips, it follows that first film chip is supported by the release disc for only a limited time. This time is the time required for a point 182 of the release disc to travel below the top edge 184 of the first film chip, continue through six o'clock position, and then pass up again above the top edge of the film chip. During this interval the next successive point 180 on the separation disc 174 slices between the first chip leaning on the release disc 176 and the second chip which is leaning on the first chip. Thus, when the point 182 of the second disc moves out from behind the first chip thereby releasing the first chip, the second chip will be held by the next successive point 180 on the separation disc 174. The second chip will continue to be held by this point so long as this point is behind the second chip, and when this point moves out from behind the second chip, it will be followed immediately by the next occurring point 182 of the second disc. The latter point will then support the second chip, which is now in the position occupied by the first chip previously released. This second chip will then be held by said next successive point 182 until that point has moved out from behind it. As each chip is released by disc 176, it will immediately zoom down the rails under the influence of the air pressure gradient. It has been determined in practice that this chip release mechanism is capable of very reliable and fast operation in the range of 25 to 100 chips per second, without any appreciable wear on the chips.

Shaft 178 is driven by a system now to be described. As seen in FIG. 8, shaft 168 carries a pulley 188 which is driven by a belt 190. Belt 190 is mounted on a pulley 192 which in turn is mounted on a shaft 194. Shaft 194 carries a large pulley 196 which is driven by a belt 198. Belt 198 in turn is mounted on a pulley 200 which is mounted on a shaft 202. This shaft is connected by means of an electromagnetic clutch C2 and a shaft 204 to the motor M2. Shaft 202 is also attached to an electromagnetic brake B2, whose housing is affixed to a suitable wall member 206. Shaft 178 is driven from motor M2 through clutch C2 only so long as the clutch is engaged. The brake B2 is normally disengaged and it is engaged at the same time that the clutch C2 is disengaged. In this manner the brake B2 operates to bring the discs 174 and 176 to a rapid stop.

Due to the high speed at which the chips travel along the rail system, as well as the high speed at which the discs 174 and 176 rotate, there exists the possibility that at the instant that a signal is transmitted to the brake B2 to stop rotation of the discs, a film chip will be released by disc 176. This released chip will interfere with optical projection of the information on the preceding chip, which, in the normal course of events, would be the chip which prompted the delivery of a signal to brake B2. Accordingly, some means must be provided to stop movement of this released chip before it is in a position to interfere with projection of the information on the selected preceding chip. The means for accomplishing this is illustrated in FIG. 3. This means comprises an electromagnet 210 and a level 212 which is pivoted for limited movement. One end 214 of lever 212 is positioned so as to be attracted by the magnet. So long as the magnet is de-energized, end 214 of the lever is displaced from the magnet and the opposite or forward end of the lever hangs down. Pivotally secured to the forward end of the lever is a chip trap element comprising a horizontal section 216 and two depending fingers 218 and 220. These two fingers are sufficiently long to hang down in intercepting relation with chips on the four rails so long as the magnet 210 is de-energized. However, when the magnet is energized, the fingers 218 and 220 are raised to a level above the film chips on the guide rails thereby permitting chips to move along the rails without interruption. In practice, magnet 210 is energized at the same time as clutch C2. Thus, so long as the discs 174 and 176 are feeding film chips, the trap comprising fingers 218 and 220 will be in elevated position. However, as soon as a signal is generated to terminate operation of discs 174 and 176, the fingers immediately will drop down in position to terminate flow of film chips beyond the point at which the fingers are located.

In practice, magnets 204 and lever 212 are part of a conventional relay which also comprises a plurality of contacts (not shown) which close (or open) when the magnet is energized. These contacts are used for different purposes as, for example, to establish a holding circuit for the magnet since the magnet will be energized by a short pulse of electric current. These circuit features are not novel, but are purely conventional and, therefore, are not believed to require further description or illustration.

Figure 10:
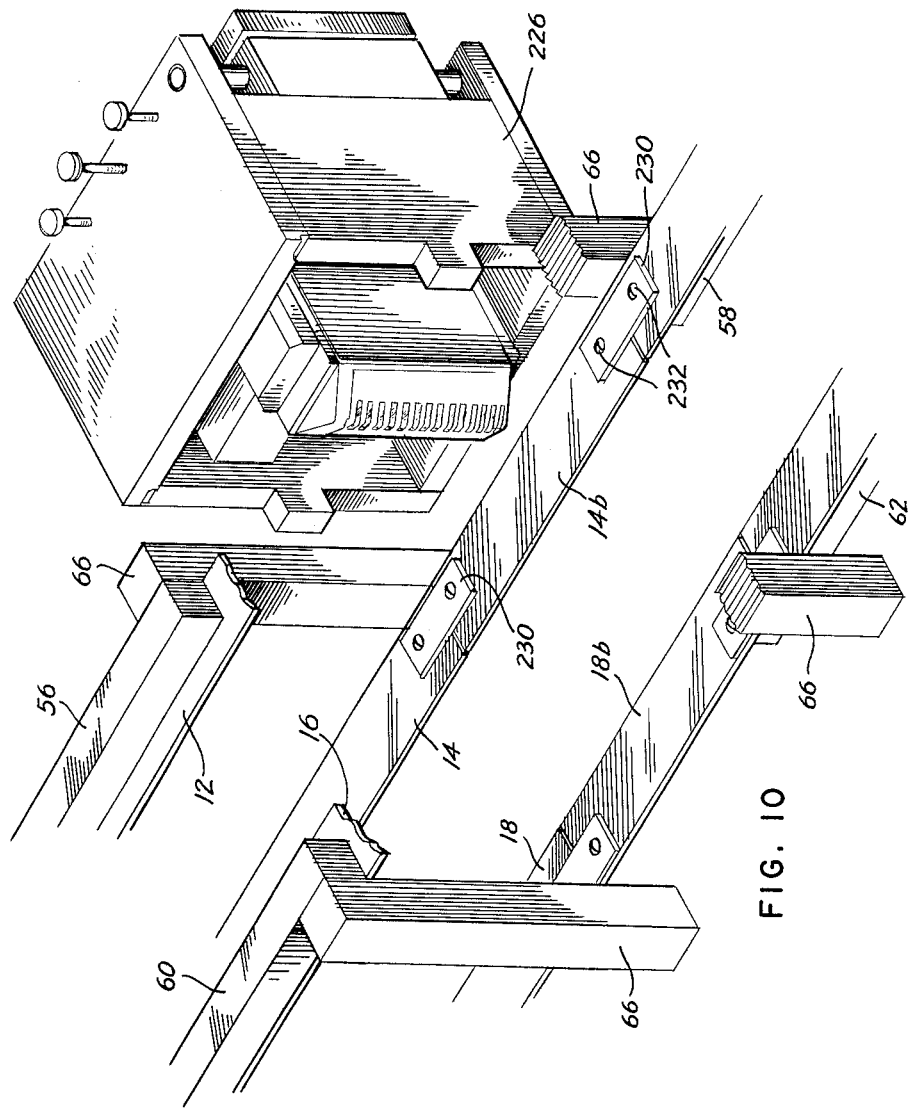
FIG. 10 is a perspective view illustrating the disposition of the magnetic read head relative to the guide rail system, and also illustrating details of construction of the guide rail assembly.

FIG. 10 illustrates the sensing unit which is generally identified by the numeral 226. This sensing unit 226 is mounted alongside the rails 12 and 14. It consists of a plurality of magnetic reading heads 228. It is to be noted that all of the magnetic heads 228 are disposed between the two tracks 12 and 14. However, they do not extend into the passageway traveled by the film chips. Therefore, the sensing unit in no way impedes travel of the film chips. For ease of access to the sensing unit, it is preferred that the rails be in sections in the area of the sensing unit. The preferred embodiment is to utilize a short connecting section of rail, as for example, the connecting sections 14b and 18b, which sections are connected to the corresponding sections 14 and 18 by means of short straps 230. The latter are removably secured to the rails and the removable sections by means of screws 232.

In the illustrated embodiment the magnetic heads are aligned in a vertical plane. Therefore, since the film chips are inclined at a 45° angle, it follows that all of the encoded information on the stripe 30 will not be read simultaneously. Instead, a serial output will result, with the encoded information located at the top or leading end of stripe 30 being read first and the encoded information recorded adjacent the bottom or trailing end of stripe 30 being read last. However, if desired, the sensing unit may be oriented at a 45° angle so that the different read heads 228 will read all of the coded information on the stripe 30 at once.

Although the coded identification information is recorded on the stripe 30 but is edge read by the heads 228, it is to be understood that optical coding is also feasible, placed either near the edge of the film chip or on one of its surfaces.

Assuming that a film chip moving past the sensing unit 226 has been determined by the latter to have the desired identification code, some means must now be provided for making the selected chip available for use, either in a projection system or by some other means. One way to make the selected chip available for in-system use is to trap the selected chip after it has passed the sensing unit 226. Preferably, this is accomplished by a second trapping unit substantially similar to the trap already described for stopping chips which have been released by the release mechanism just after the sensing unit 226 has sensed that a preceding chip has the desired identification code.

Figure 11:
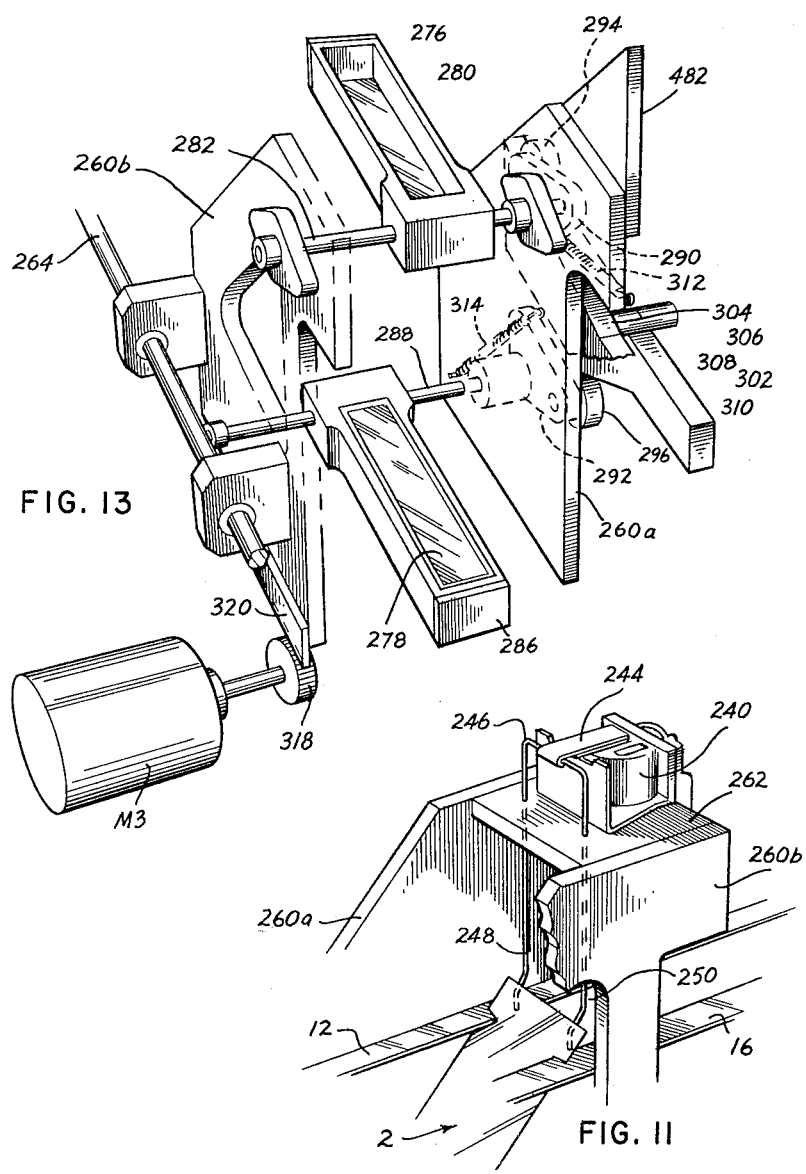
FIG. 11 is a perspective view of a trap mechanism for stopping a film chip at the projection system stage.

As seen in FIGS. 3 and 11, the second trap consists of a magnet 240 which is mounted directly above the four rails on a carriage 242. The latter is described hereinafter in connection with the optical projection system. Pivotally mounted above the magnet 240 is an arm 244. Arm 244 is biased by a spring (not shown) so as to be displaced from the magnet 240 when the magnet is not energized. At the end opposite its pivoted end, the arm 244 carries a trap element which consists of a horizontal section 246 and two depending fingers 248 and 250. The connection section 246 is rotatably connected to the arm 244. So long as the magnet 240 is not energized, the fingers will be held in elevated position and film chips will be free to pass beneath them. However, upon energization of the magnet, the fingers 248 and 250 will drop down to a level where their bottom ends will be in position to stop and support a film chip 2 as shown in FIG. 11.

Referring now to FIGS. 3 and 12–18, the projection system includes the carriage 242 which comprises a pair of spaced vertical plates 260a and 260b connected by a transverse member 262 on which magnet 240 is mounted. Vertical plates 260a and 260b are mounted for movement along a pair of guide rods 264. Only one of these rods is visible in the drawings. The second rod is located behind the carriage adjacent to a vertical wall 266 which is mounted on table 40. The carriage is movable along guide rods 264 between predetermined limits inside guide rod supports 268 and 270. It is to be noted that the table 40 is provided with a large opening 272 in order to accommodate certain apparatus hereinafter described. The carriage carries two glass plates 276 and 278. Glass plate 276 is mounted in a rectangular frame 280 secured at one end to a shaft 282 which is rotatably supported by the vertical plates 260a and 260b. Frame 280, when in a horizontal position, is located above the top rails 12 and 16 a distance sufficient so as not to interfere with movement of the film chips. The bottom glass plate 278 is mounted in a rectangular frame 286 which is secured to a transverse shaft 288 that also is rotatably supported by the carriage plates 260a and 260b. When the frame 286 is in a horizontal position, it is below the level of film chips traveling along the guide rails.

Shafts 282 and 288 are provided on their ends adjacent the vertical partition 266 with arms 290 and 292. These arms are provided with cam rollers 294 and 296, respectively.

Cooperating with cam roller 294 is a cam plate 300 (FIGS. 18A, B, C) that is attached to the vertical wall 266. Cooperating with the cam roller 296 is a second cam plate 302 which also is attached to the vertical wall 264. The top cam plate 300 has an inclined cam surface 304 which terminates in a horizontal cam surface 306. The bottom cam plate 302 has an oppositely inclined cam surface 308 and a corresponding horizontal cam surface 310. Since the shafts 282 and 288 are offset from each other, it is necessary for the cam plates 300 and 302 to be displaced correspondingly from each other. In this way, the rollers 294 and 296 will engage corresponding portions of cam plates 300 and 302, respectively.

Figure 18A:
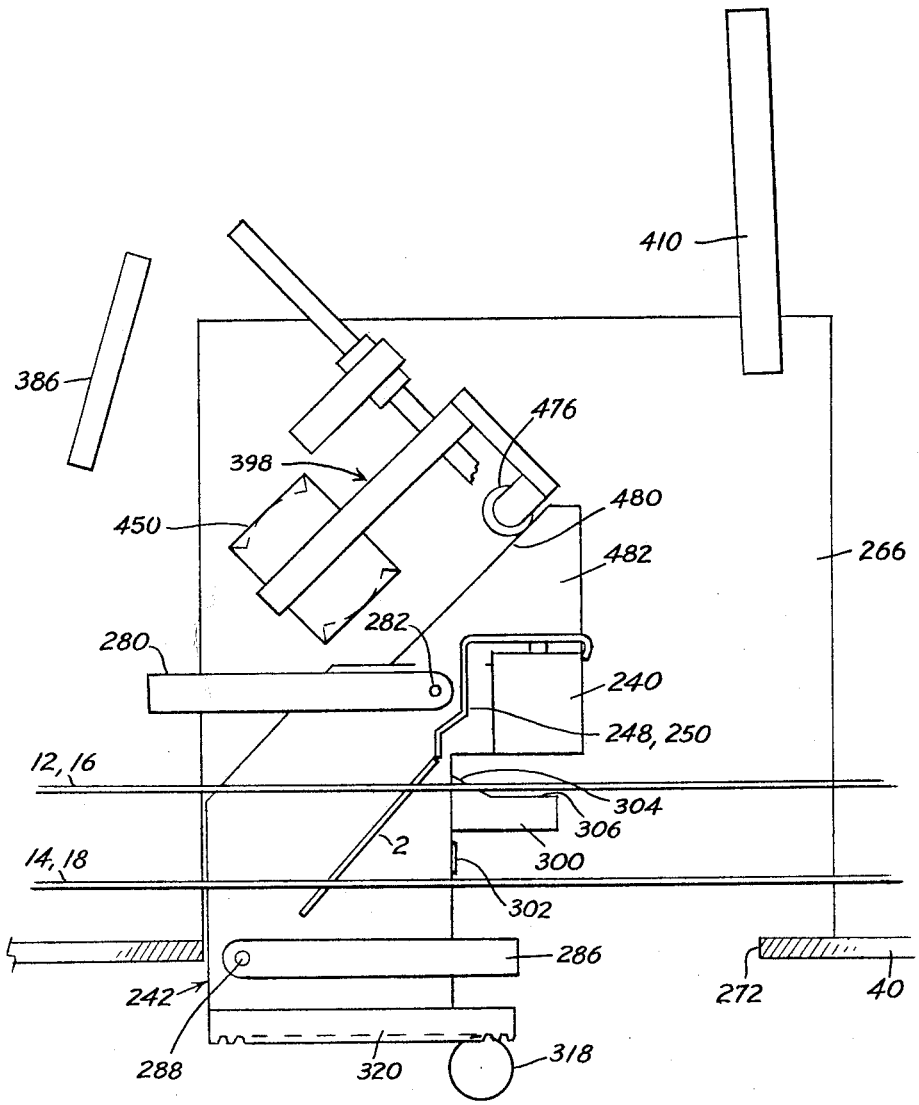
FIG. 18A is a schematic view showing the relative positions of the lens system and the mirrors when the projection carriage is in its forward at rest position.
Figure 18B:
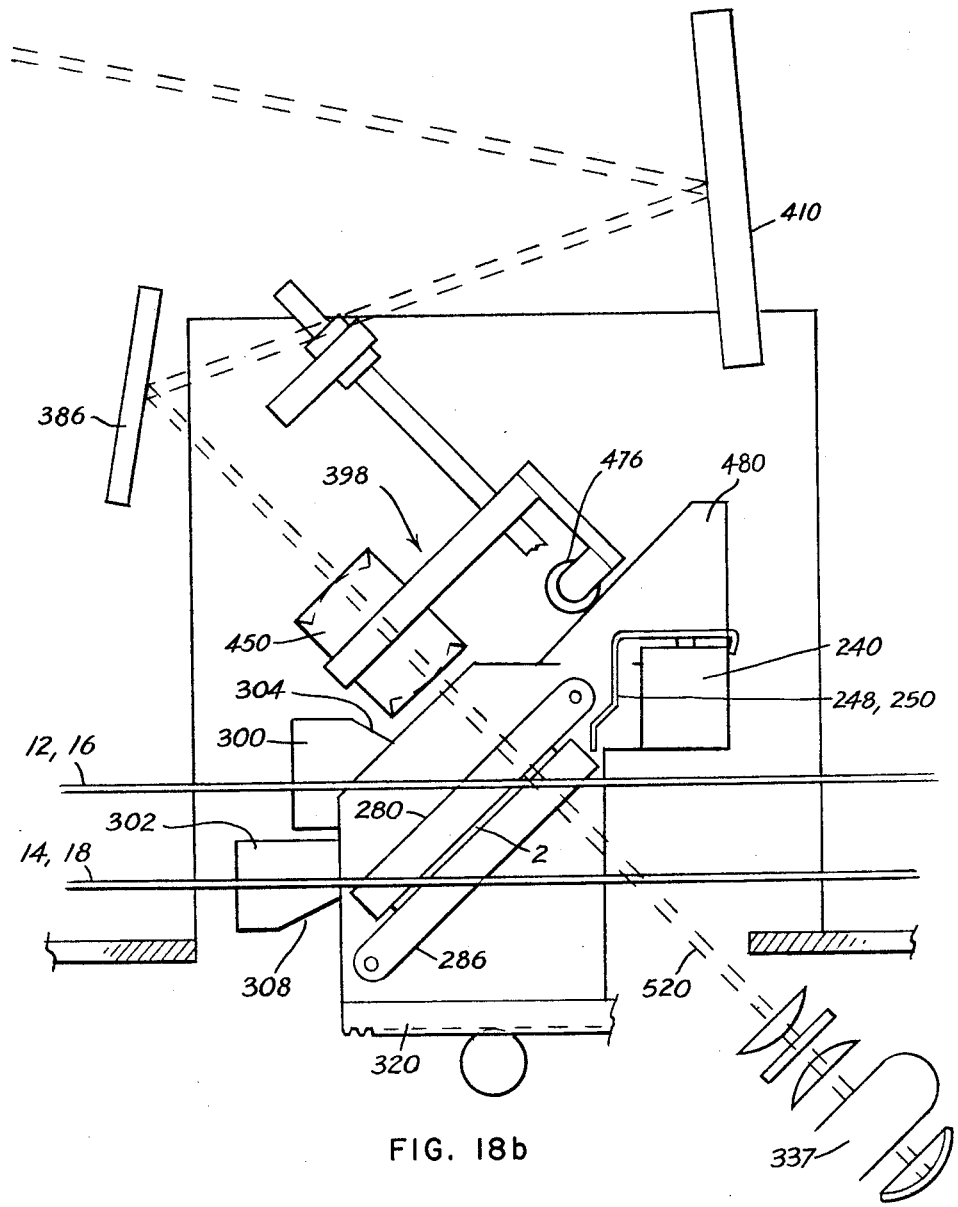
FIG. 18B is a view similar to FIG. 18A, but with the carriage in its first intermediate position.

When the carriage is in its forward position, as shown in FIG. 18A, the glass plate frames 280 and 286 will be in a horizontal position. They will be maintained in this position by cam surfaces 304 and 308 acting on arms 290 and 292 through rollers 294 and 296 respectively. Opposing the forces exerted by the cam surfaces on the cam rollers are springs 312 and 314 (see FIG. 13). These springs are connected between carriage plate 260a and arms 290 and 292 so as to urge shafts 282 and 288 counterclockwise (as viewed in FIGS. 18A, B, and C). As the carriage moves rearwardly, the cam rollers will move along the inclined surfaces 304 and 308 toward the horizontal surfaces 306 and 310 and, as they do so, springs 312 and 314 will cause the glass plate frames to swing toward each other. By the time the rollers reach horizontal surfaces 306 and 310, the glass plate frames 280 and 286 will have assumed 45 degree positions as illustrated in FIG. 18B. They will maintain these positions so long as rollers 294 and 296 are on the horizontal cam surfaces 306 and 310.

Movement of carriage 242 is accomplished by a reversible motor M3 (FIGS. 3 and 13). The output shaft of this motor carries a gear 318 which meshes with a rack 320 attached to the vertical carriage plate 260b. The distance through which carriage 242 can be moved by operation of motor M3 is determined by two limit switches 322 and 324 which are disposed on table 40 alongside the carriage. Two other switches 326 and 328 are located at intermediate points between limit switches 322 and 324. In addition two similar switches 330 and 332 are located in side-by-side relation with limit switch 324. Switches 326 and 328 are motor controlling switches and their function is to stop the carriage 242 at two different points along guide rods 264, whereby to permit optical projection of the upper half of the trapped film chip at the first of said two points and projection of the lower half of the trapped chip at the second of said points. How this is accomplished is explained hereinafter. Of course, the optical system could be made to project all of the data on a film chip in one shot, in which case a single central switch would be used in place of switches 326 and 328. It is to be noted the switch 326 is located at a point corresponding with the beginning of horizontal cam surfaces 306 and 310. The function of switches 330 and 332 is explained hereinafter.

Figure 12:
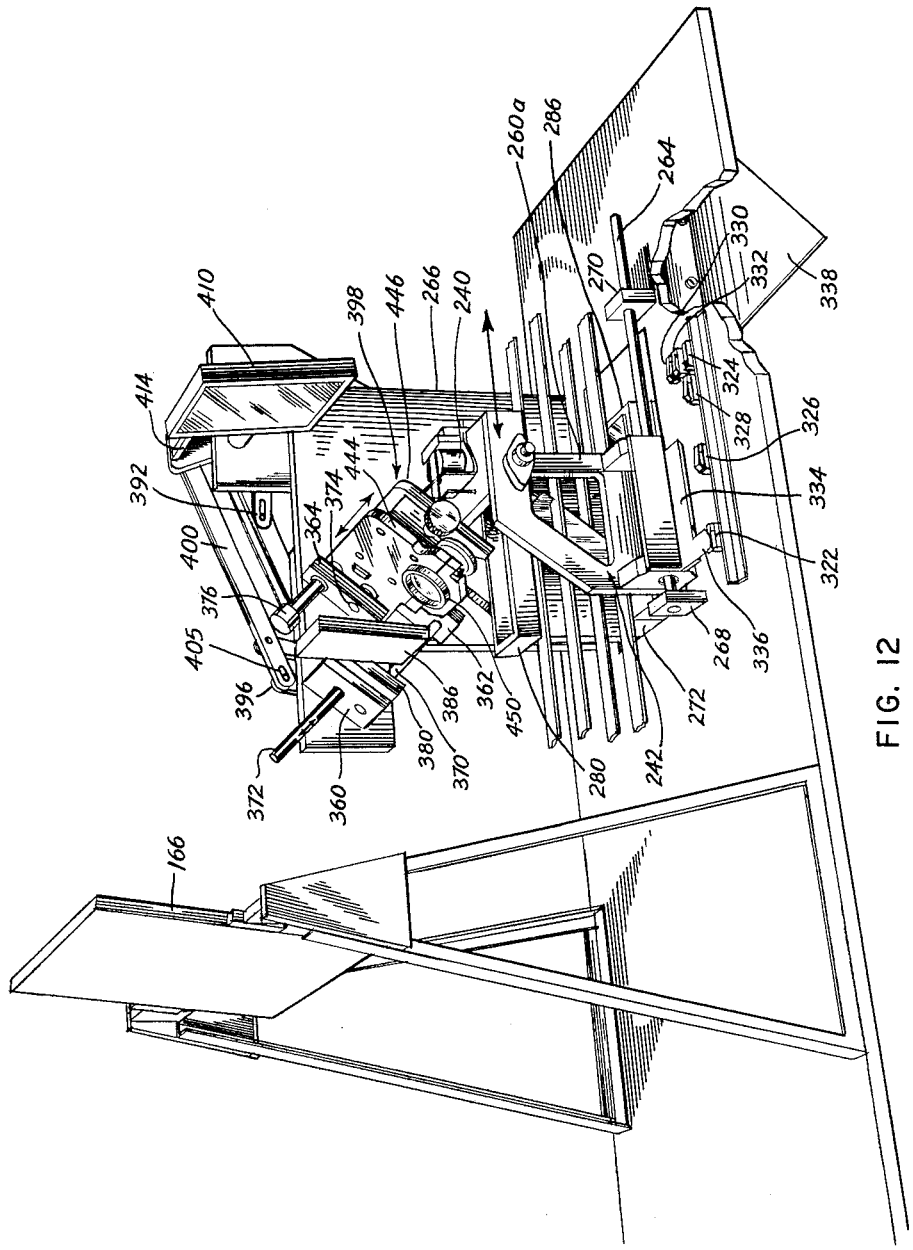
FIG. 12 is a perspective view illustrating the complete projection system embodied in the apparatus of FIG. 3.

The foregoing switches are operated by a bar 334 attached to carriage 242. Bar 334 is positioned so as to actuate switches 330 and 332. Bar 334 has a lateral extension 336 which is disposed so as to actuate switches 322, 326, 328 and 324 in turn. The length of bar 334 is such that it will operate switches 330 and 332 at the same time that projection 336 operates switch 326. It will continue to operate switches 330 and 332 as the projection 336 passes from switch 326 to switch 324. When switch 330 is normally open and when it closes it energizes a projection lamp 337 (FIG. 18A) contained within a projection lamp housing 338 (FIGS. 3 and 12). Switch 332 is in the holding circuit of magnet 240. Switch 332 is normally closed and when it is opened, it deenergizes the magnet so as to lift fingers 248 and 250 out from behind the chip previously trapped thereby. It is to be noted that the fingers 248 and 250 are located slightly downstream of the upper glass frame 280 so as not to interfere with movement thereof. Restoring the fingers to their normal elevated position is necessary so that when subsequently the glass frames are pivoted back to their normal horizontal positions, the film chip will be free to resume travel along the guide rails. It is to be noted also that as the bottom glass frame 286 swings upward to its forty-five degree use position, it pushes the trapped film chip off of the fingers 248 and 250 and shifts it back along the rails toward the downwardly swinging top glass frame 280. The amount of movement of the chip along the rails is relatively small, being just long enough to free it from the fingers.

Obviously, the two glass plate frames will begin to return to their horizontal positions as soon as the cam rollers begin to ride back along inclined cam surfaces 304 and 308. However, the film chip previously sandwiched between the two glass plates will not be free to travel along the four guide rails to its ultimate destination until the bottom glass frame has swung below the bottom edge of the chip. The ultimate destination may be a reservoir or a magazine, thereby providing automatic filling of the magazine.

Figure 19:
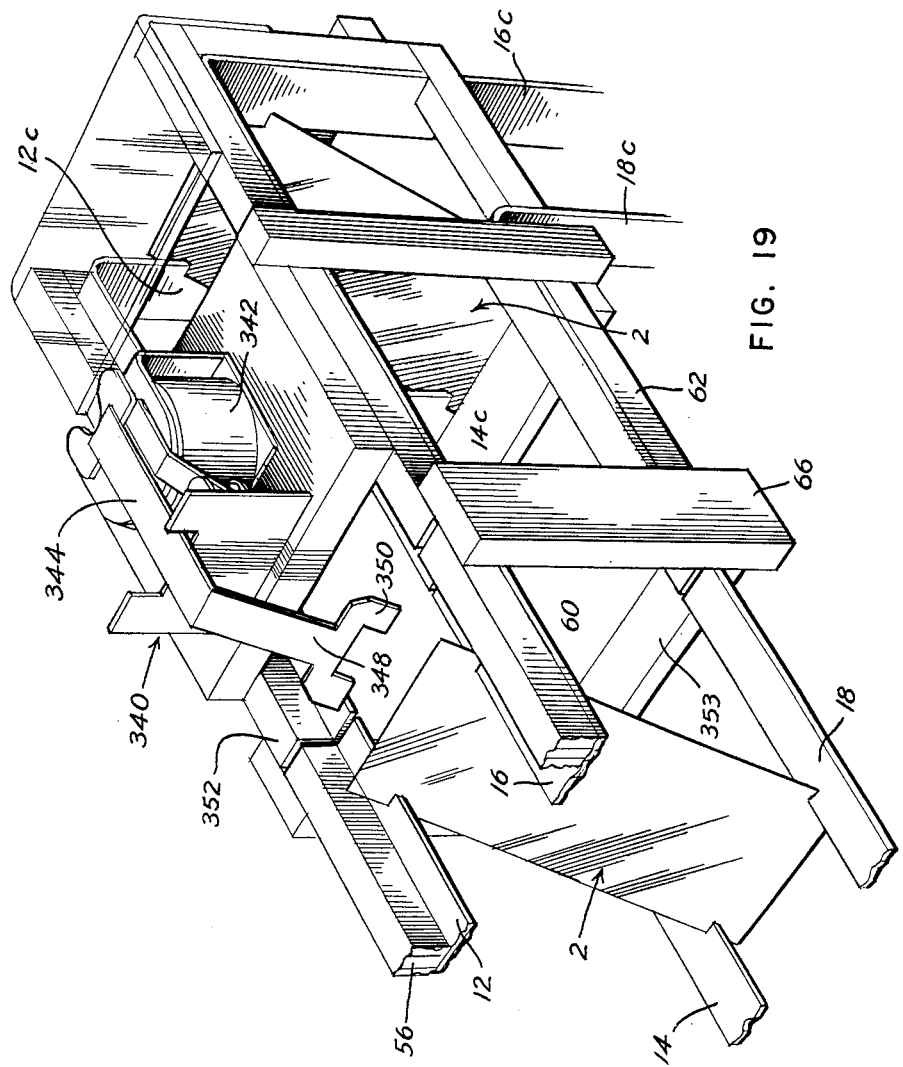
FIG. 19 is a perspective view of a third trap embodied in the device of FIG. 1, plus means for directing film chips to a storage device.

Before describing in detail the optical projection system which is utilized when the film chips are sandwiched between the two glass plates, reference is had to FIGS. 3 and 19 where a third trapping unit 340 is displayed. This third trapping unit is located downstream of the optical projection stage. This third trapping unit comprises electromagnet 342 having an arm 344 which is biased by a spring 346 (FIG. 3) away from the end of the magnet 342. Arm 344 has at its upstream end a downwardly extending leg 348 which is provided with a T-shaped terminal portion 350. Normally, the magnet 342 is de-energized and the arm 344 is elevated so that the terminal portion 350 is above the level of film chips on the four rails. When the magnet is energized, the arm is drawn down sufficiently to interpose the T-shaped section 350 in the path of film chips traveling on the guide rails. At the location of the T-shaped section 350, the guide rails are split, as illustrated at 352 in FIG. 1 and also FIG. 19. Although not fully visible in the drawings, the bottom guide rails are split at the same point. The gap at the split is larger than the thickness of the film chip. Thus, when magnet 342 is energized so as to trap a film chip, the film chip which is trapped may be removed through gaps provided by the splits 352 in the rails. The magnet 342 is energized by means forming part of the control circuit when it is determined as a result of inspection of the film chip by the sensing unit that a bit of its encoded indicia is missing from a spot where the bit should normally be present. When this occurs, the control system will not cause the film chip to be trapped by the second trap associated with the projection mechanism. Instead, it will allow the film chip to travel along to the third trapping mechanism, where it will be stopped for manual removal from the four-rail system. When the top end of a chip is stopped in the gaps in the top rails by the T-shaped section 350, it will tend to flip over so that its bottom end will be in a leading position. However, it is prevented from doing so by a stationary bar 353 which is disposed below the bottom rails 14 and 18 in the region of their splits 352. Bar 353 is so located that it will not interfere with a chip so long as the chip is in its normal inclined position; but will block the bottom end of a chip held back by T-shaped section 350 when the chip moves to a near vertical position.

It is to be noted further that the ends of the rails 12, 14, 16 and 18 terminate in a downwardly extending branch formed by rail sections 12c, 14c, 16c and 18c. The corner formed by the rails 12 and 16 with the rail sections 12c and 16c preferably is covered with an angle member 354 which preferably is transparent. This angle member is not in position to obstruct movement of film chips. Instead it functions as a baffle to deflect the air stream downward. When the film chips reach the end of the tracks 14—18, they turn the corner and then travel downwardly along the guide rails 12c, 14c, 16c and 18c. In this manner, it is possible to deliver the individual film chips into a storage hopper or even into a supply magazine. If desired, auxiliary air feed mechanisms may be provided whereby film chips which are stored in a reservoir or magazine located at the bottom ends of rails 12c, 14c, 16c, and 18c, may be blown back up onto the guide rail system previously described so as to be re-read by the sensing unit, but in a reverse direction, or so as to be returned to the original feed magazine. In this way automatic reloading of the original magazine will be accomplished with the film chips in their original positions.

Referring now to FIGS. 12 and 14–17, the vertical partition 266 supports various elements which form part of the optical projection system. The vertical partition 266 has two pairs of parallel bearing guide blocks, 360, 362, 364, and 366. All but bearing block 366 are visible in FIG. 12; bearing block 366 is shown in FIG. 17. It is to be noted that bearing blocks 360 and 362 are in alignment with each other along a given inclined plane. The two blocks, 360 and 362, support a first stationary guide rod 370. They also include bearing members for slidably supporting a movable guide rod 372. The other two guide blocks, 364 and 366, also support a stationary guide rod 374, as well as a slidable guide rod 376. Mounted on guide rod 370 is a rectangular block 380. Block 380 also has a second hole through which extends the guide rod 372. Block 380 is slidably mounted on rod 370 but is fixed to rod 372. Therefore, block 380 and slide rod 372 will move as a unit. Block 380 has a laterally extending bore through which extends a shaft 384 (FIG. 14). Attached to one end of this shaft is a mirror frame 386. The opposite end of shaft 384 extends through an inclined slot 387 formed in vertical partition 266 and carries a rotatable pulley 388. The end of shaft 384 also extends through a slot 390 formed in an elongated arm 392. Attached to the extremity of shaft 384 is a small link 396. Link 396 is not rotatable relative to shaft 384.

Mounted on the guide rod 374 for slidable relative movement is a lens mount generally identified by the numeral 398. The guide rod 376 extends through and is securely fastened to the lens mount 398. Therefore, the lens mount 398 will move with the guide rod 376.

Referring now to FIG. 14, the link 396 is pivotally secured to an elongated link 400 which is disposed parallel to the elongated link 392. A second short link 402 is connected to the two links 392 and 400 parallel to the other short link 396. It is to be noted that the upper end of the link 396 has a pivot pin 404 which is disposed in an elongated slot 405 in one end of the top elongated arm 400. The opposite ends of elongated arms 392 and 400 are pivotally secured to a small pivot shaft 406 and a pivot pin 408. Shaft 406 is mounted on and extends through a plate 266a which is fixed to and functions as an extension of the partition 266. Shaft 406 has secured to its opposite end a mirror frame 410. The mirror frame is firmly secured to the shaft 406 so as to rotate therewith. The pivot pin 408 which supports the link 400 is mounted on a triangular arm 412 which has a lateral extension 414 which is secured to the mirror frame 410. Arm 412 is mounted on and is rotatable relative to shaft 406. Pivotally connected to the elongated link 392 at a point intermediate the ends thereof, is an L-shaped crank arm 416. Crank arm 416 has an elongated slot 418 which accommodates a pivot pin 420 carried by link 392. Crank arm 416 is pivotally secured to plate 266a by means of a short pivot pin 422. The opposite end of the crank arm 416 is provided with a pivot pin 424 which supports a link 426. The opposite end of link 426 is rotatably mounted on pivot pin 408. It is to be noted in passing that the distance between shaft 406 and pivot pin 420 is identical to the distance between shaft 406 and pivot pin 422.

Attached to the upstream or free end of the elongated lever 392 at point 430 is a wire string 432. Wire string 432 passes around an idler pulley 434 mounted on a stub shaft 435 which is rotatably mounted in the vertical wall 266. The opposite end of the string 432 is attached to a tension spring 436 which is anchored adjacent the bottom end of the vertical wall 266. It is believed to be apparent that the effect of spring 436 is to pull on the string 432 so as to urge the elongated link 392 to pivot upward about the axis of shaft 406.

As seen in FIGS. 12, 16 and 17, the lens mount 398 comprises two parallel plates 444 and 446. These two plates are secured to each other by means of a pair of connecting plates 448 and 450. The latter is broken away in FIG. 17 for convenience of illustration.

The two plates 444 and 450 have aligned openings in order to accommodate a lens system generally identified by the numeral 450. Extending through these two connecting plates 448 and 450 is a rotatable shaft 452 on the end of which is mounted a gear 454. Interposed between the two plates 444 and 446 is a movable L-shaped element 460 which carries on its bottom edge a rack 462. The movable element 460 has a lateral extension 463 (FIG. 16) which has a hole through which slidably extends the guide rod 376. Secured to this movable portion 460 and its lateral extension 463 by screws (not shown) is a flat L-shaped plate 466 which overlies the upper edge of the lens mount plate 446. The flat plate 466 is provided with an elongated slot 468 through which extends a set screw 470 having an enlarged head. Set screw 470 is screwed into the spacer plate 450. When the set screw is turned down tight, the flat plate 466 and, therefore, the movable member 460 and the rack 462, are incapable of movement relative to the two plates 444 and 446. Similarly, extension 463 of movable member 460 is incapable of movement relative to the guide rod 376. However, when the set screw is backed off, the movable member 460 may be moved relative to the two plates 444 and 446 by rotation of shaft 452 which is fitted with a knob 472 for each manipulation.

Attached to the rear end of the flat plate 466 is a cam wheel 476. Cam wheel 476 rides on an inclined cam surface 480 provided by a plate 482 which is attached to the inside carriage plate 260a (see FIGS. 13 and 17). Cam surface 480 is at the same angle as the chip sandwiched between the two glass plates 276 and 278.

It is to be noted, as seen best in FIGS. 14 and 16, that the lens mount plate 444 is provided with two parallel extensions 490 which extend through separate but identically inclined slots 494 formed on the vertical wall 266. Attached to these extensions is a short bar 498 which is inclined downwardly toward the upstream end of the machine. Attached to the upstream end of the bar 498 is a spring 500 and also a wire string 502. The bottom end of the spring 500 is attached to the vertical panel 266. String 502 passes around rotatable pulley 388 and then extends rearwardly parallel to the two long links 392 and 400 to a circular disc 508 which has the same diameter as pulley 388 but which is stationary. Disc 508 is secured to vertical plate 266a and shaft 406 passes through it. String 502 is secured to the periphery of disc 508. It is kept taut under the influence of pulley 388 which is influenced by the pull of spring 436 and string 432 acting through link 392 and shaft 384.

From the foregoing description it will be appreciated that the lens mount assembly 398 and guide rod 376 are movable as one unit and that guide block 380, mirror 386, and pulley 388 are movable as a separate unit along parallel inclined paths determined by guide rods 374 and 370 respectively. However, they are connected by string 502. Accordingly, in addition to urging the lens mount assembly downward along guide rod 374 so as to maintain cam roller 476 in engagement with cam surface 480, spring 500 urges pulley 388 and, therefore, mirror frame 386 to do the same in opposition to the tension exerted by spring 436 acting through string 432.

When the carriage moves toward the infeed end of the machine the lens mount and mirror frame 386 will move upward; correspondingly, when the carriage moves in the opposite direction, they will move downward. This means that the distance between the lens system 450 and a film chip sandwiched between the glass plates 276 and 278 will remain constant for different positions of the carriage. However, to keep in focus the image projected on the screen 166, it is necessary also to maintain a constant distance between the lens and the screen. Part of this distance, i.e., between mirror frame 410 and screen 166, already is fixed. However, the distance between mirror frame 386 and mirror frame 410 will change as mirror frame 386 moves along the inclined path determined by guide rods 370 and 372. Accordingly, it is necessary to maintain constant the distance between the lens mount and mirror frame 410 regardless of a change in the distance between the two mirror frames. This is achieved by string 502 which extends from bar 498 (connected to the lens mount substantially in the plane of plate 444) around pulley 388 (mounted on an axis which is located in the plane of mirror frame 386) to disc 508 (whose axis is located in the plane of mirror frame 410). Since the length of string 502 is fixed and since it is always maintained taut, a change in the length of that portion of the string between pulley 388 and disc 508 will always be accompanied by an opposite change in the length of that portion of the string between pulley 388 and bar 498. Since pulley 388 and disc 508 are of equal size, an increase or decrease in the amount of string wrapped around pulley 388 will be accompanied by an opposite change in the amount of string wrapped around disc 508. Therefore, the wrap-around phenomenon is effectively cancelled out as a source of error.

However, it is not sufficient to keep constant the distance between the lens mount and the mirror frame 412. It is also necessary that the two mirror frames always be in position to direct the projected image onto the screen 166. Unfortunately, when the mirror frame 386 shifts its position, it creates a new angular relationship with mirror frame 410, thereby disturbing the path of a beam of light projected by the lens system. This phenomenon can be explained by reference to FIGS. 18A, B, and C. FIG. 18A shows the carriage in its rest position, with cam roller 476 at the top of cam surface 480. FIGS. 18B and C show the carriage in its two different use positions, with the lamp 337 energized to direct a light beam 520 through the film chip 2 and the lens system 450. As will be observed from a comparison of FIGS. 18B and 18C, the lens system and mirror frame 386 are lower in FIG. 18C.

Figure 18C:
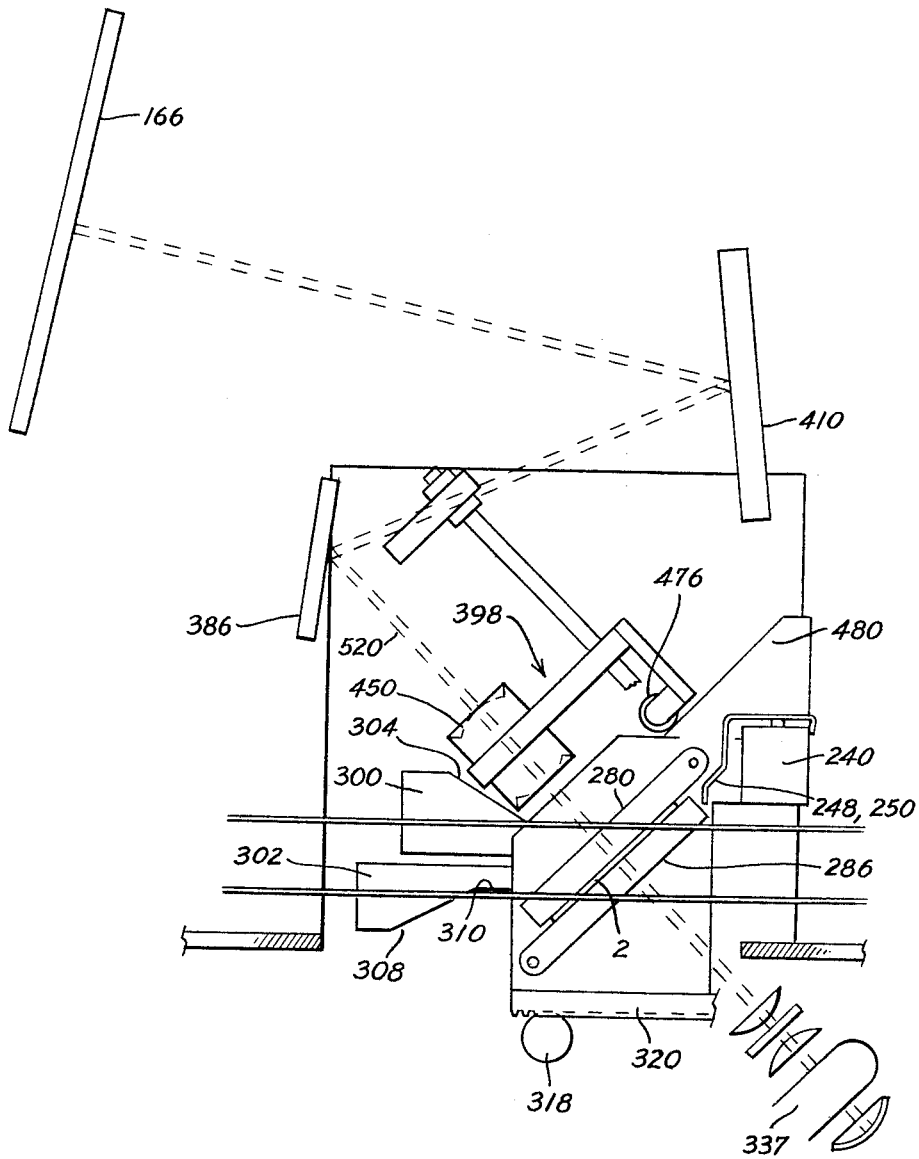
FIG. 18C is a view similar to FIG. 18A, but with the carriage in its second intermediate position.

Consider now a first line drawn from the center of mirror frame 410 to the center of mirror frame 386 when the latter is in the position of FIG. 18B, and a second line drawn between the same two centers when mirror frame 386 is in the position of FIG. 18C. These two lines will intersect at an angle $\alpha$ at the center of mirror frame 410. This new angular relationship creates new angles of incidence and reflection which disturb the path of light beam 520 so that the projected image wholly or partly misses the screen.

The function of the linkage between the two mirror frames is to rotate them in synchronism with the straight line movement of mirror frame 386 so as to adjust automatically for changes in the distance between the two mirror frames. The linkage accomplishes this in the manner now to be described.

When the mirror frame 386 shifts to produce a new angular relationship characterized by the angle $\alpha$ as previously described, the elongated link 392 will rotate on its pivot 406 through the same angle. As a consequence, crank arm 416 will rotate on its pivot 422 through an angle equal to $\alpha/2$. Due to the coupling effected by link 426, arm 412 and, therefore, mirror frame 410 will rotate through the same angle, namely, $\alpha/2$, as crank arm 416. Similarly, because of the parallel linkage comprising arm 412, links 392 and 400, and links 396 and 402, shaft 384 and, therefore, mirror frame 386 will rotate through an angle of $\alpha/2$ degrees. The two mirrors will rotate in the same direction. Therefore, the angular adjustments of the two mirror frames are additive, giving the desired total correction of $\alpha$ degrees.

It is to be noted in passing that the illustrated linkage makes use of the geometric principle that the angle between two given radii of a circle is always equal to twice the angle between two chords which emanate from a common point on the circle and terminate at the same points on the circle as do the two radii. In this case pivot point 406 corresponds to the center of the circle and pivots 420 and 422 correspond to points on the circle itself. However, since pivot 422 is fixed, the portion of crank 416 between pivots 420 and 422 will correspond to a chord of the circle whereas link 392 will correspond to the radius of the circle. As a consequence of this arrangement, the crank arm will always rotate half as much as link 392.

FIG. 20 illustrates a suitable electrical system for operating and controlling the mechanisms which have been just described. In this figure solid lines represent electrical connections and broken lines indicate mechanical connections.

Fan motor M3 and main motor M2 are energized directly from a suitable alternating current power source 530 through suitable manual switch means (not shown). In addition current is supplied from source 530 to a power supply 532 for a coincidence detector 534. The latter is illustrated in more detail in FIG. 21. The lens carriage motor M3 is supplied with current either directly through a manually operated positioning and reversing switch system 536 or through a relay 538 and an automatic positioning and reversing switch system 540. Output signals from the coincidence detector 534 are used to operate clutches C1 and C2 and brakes B1 and B2 in the sequence previously described. Additional outputs from coincidence detector 534 are used to operate the several traps and relay 538.

The coincidence detector 354 comprises a multi-channel pre-amplifier 544 which amplifies the several inputs from the magnetic sensing unit 226 and applies them to a multi-channel flip-flop unit 546 wherein each input operates a different flip-flop. An automatic reset circuit 548 is provided to clear all of the flip-flops between signals from successive chips. The output from flip-flop unit 546 is applied to a coincidence comparator 550 where the pulse output is compared with accession signals produced by a desired accession number unit 552. The latter can be set to produce different combinations of signals each representative of a different binary number. Each time the signals from flip-flop unit 546 match with the signals from the accession number unit 552, the comparator will produce an output signal that is applied to a trigger circuit 554 to generate a pulse to operate the No. 2 trap, i.e., energize magnet 240, and also to operate the No. 1 trap, i.e., to de-energize magnet 210.

Coincidence comparator 550 is also designed to generate a special output when the output from flip-flop unit 546 lacks one or more bits of information. This special output is applied to a second trigger circuit 556 which generates a pulse to operate the No. 1 and No. 3 traps, i.e., magnets 210 and 342. A reset circuit 560 (FIG. 20) is provided to de-energize magnets 210 and 342 after removal of the trapped film chip which has been found to lack a bit of its identifying code.

The manual and automatic positioning and reversing units 536 and 540 both include switches 322, 326, 328 and 332. In the case of manual unit 536, the carriage will stop when switches 326 and 328 are triggered and will not start again until a separate control switch (not shown) is manually operated. In the case of automatic unit 540, the carriage will stop when switches 326 and 328 are actuated, but will start again after a predetermined time delay. With both units 536 and 540, the carriage will not return to its normal position until it has travelled its full stroke so as to operate reversing switch 332.

When limit switch 322 is actuated on the return stroke of the carriage, it will actuate a relay (not shown) which will re-establish energization of clutches C1 and C2 and magnet 210, thereby restoring the flow of sheets along the rails. Of course, brakes B1 and B2 are released when the clutches are energized.

It is to be observed that the electrical circuits and components which are illustrated schematically in FIGS. 20 and 21 are well known to persons skilled in the art of data processing machinery and motor controls and, for this reason, a more elaborate exposition of their construction is not believed to be necessary.

Although not necessary it is preferred that film chips be corrugated adjacent each edge as shown at 564 and 566 in FIG. 7. This is achieved by a simple molding operation. The corrugations resist deformation of the film chip in the plane of its path of travel, thereby eliminating any chance that the chips will bind on the rails.

Of course, it is not necessary that the film chips be projected by the system previously described. Instead they may be removed from the system for viewing by means of a separate slide projector. The chips may be removed through the gaps 352 or through other gaps provided elsewhere in the system. If gaps 352 are to be used, the third trap, i.e., magnet 342, will be disconnected from the dropout trigger circuit 556 and connected instead to the coincidence trigger circuit 554. Of course, the second viewing trap, i.e., magnet 240, will be disconnected from trigger circuit 554. Thus when the sensing unit 226 determines that a particular chip has the desired code, it will actuate magnet 342 instead of magnet 240. Operation of magnet 342 will immediately cause arm 344 to swing down so that its terminal portion 350 will be in position to stop the desired chip. The chip may then be removed manually via the gaps 352. Of course, the same result can be obtained by introducing an extra trap into the system instead of using the third trap as just described. This approach has the advantage of retaining the normal function of the third trap, i.e., to stop all chips which have been found to lack a complete identifying code. It is to be noted that removal of selected chips through gaps 352 need not be solely for the purpose of making use of a separate projection system. Instead it may be for the purpose of simple classification, i.e., of separately collecting all chips having corresponding identifying codes.

The concept of mounting the data-bearing sheets on the guide rails at an oblique angle to their path of travel is basic to the present invention. If the spacing between the upper and lower pairs of guide rails should be increased so that the chips can be oriented at a right angle to the longitudinal axis of the guide system, the chips would not travel in the uniform fashion previously described. Instead at a relatively slight imbalance of forces therein, they would fall off of the rails. Reducing the spacing between the upper and lower guide rails prevents this from occurring. In practice, the spacing between the rails is reduced to an amount just short of causing the chips to bind. In this connection it is to be noted that each of the notches 4, 6, 8 and 10 of data-bearing sheets 2 is defined by three guide-engaging surfaces. These surfaces should contact the rails without binding but with a minimum amount of shifting up, down, or sidewise. As a consequence the sheets will travel along the rails at a constant angle to their path of travel and with substantially no vertical or sidewise displacement, thereby assuring accurate readout by the sensing unit.

Incidentally, although the rails have been illustrated as straight members, it is to be noted that they may be curved in a horizontal plane so that the data-bearing sheets can be made to travel in a direction which is parallel but opposite to its original direction.

It is to be understood that the term "data-bearing sheet" is not limited to a thin or planar element. It is contemplated that a sheet may have substantial thickness or may actually comprise, for example, a plurality of film chips which are movable as a single unit. This is especially desirable where the film chips bear related information as, for example, where each chip carries a photographic image of a separate page of a publication. The chips could be secured together by suitable releasable means, such as a resilient metal clip, or they could be contained in an open box-like container adapted for movement along the guide rails. FIG. 22 illustrates one form of container 570 that may be used to transport a plurality of chips. Container 570 is open at one side and has a rectangular flange 572 having notches 574 whereby it may be mounted for movement on the four guide rails. The chips must be sized to fit within the container and may be kept therein by suitable means, such as a resilient strap 576 whose ends are inserted in suitable slits 578 formed in flange 572.

It is contemplated also that the film chips may be mounted in a frame with the notches for the guide rails formed in the surrounding frame. This has the advantage of permitting the film chip to be utilized in a slide projector. Of course, the coded identifying indicia would be carried directly by the surrounding frame.

It is to be noted also that a data-bearing sheet 2 could be provided with a second magnetic striping along the edge opposite from the first striping, and that a second sensing unit could be mounted adjacent to rails 16 and 18 for the purpose of reading information recorded in the second striping. This doubles the number of identifying code bits which can be recorded on the sheets and also the number of code bits which can be read simultaneously.

A not insignificant advantage of the present invention is that it can be used for counting as well as reading and classifying. In this connection it is to be noted that in certain situations counting can be effected with a single channel reading head. A typical example is where it is desired to count chips. In other situations a multi-channel reading head may be required for counting. A typical example of the need for a multi-channel head is where each chip has a multi-bit code representative of a number and it is desired to count all of those numbers to obtain a total.

Another advantage of the invention is that additional data-bearing sheets may be inserted into the system downstream of the infeed section. This may be done via the gap provided by a split in the rails, such as the aforementioned split illustrated at 352 in FIGS. 1 and 19. In the illustrated embodiment the sheets must be inserted from the bottom up through the lower rails 14 and 18 in order to have them oriented with their top ends in a leading position. To have their top ends in trailing position, the sheets are inserted down through the top rails. Insertion may be made while sheets are being processed or when no sheets are traveling on the rails. In the former case the inserted sheet will block oncoming sheets while it is being inserted. However, as soon as it is in place and released, it will be propelled down the rails followed by the sheets which it has temporarily blocked.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:
1. An apparatus for processing a plurality of physically identical, uniquely coded data bearing sheets comprising, an open guide system along which said sheets may be transported, said open guide system including a plurality of parallel spaced guide means for supporting said sheets at their edges, and means for establishing a fluid pressure gradient along said open guide system whereby to transport said sheets in a direction determined by said fluid pressure gradient.

2. Data processing apparatus as defined by claim 1 further including identification means for reading said coded sheets as they are transported under the influence of said fluid pressure gradient.

3. Data processing apparatus as defined by claim 1 wherein said parallel spaced guide means are disposed so as to maintain said sheets at an oblique angle to their path of movement along said open guide system.

4. Data processing apparatus as defined by claim 3 wherein said oblique angle is 45°.

5. Data processing apparatus as defined by claim 1 wherein some of said parallel spaced guide means are disposed in a first plane and the remainder of said guide means are disposed in a second plane, said first and second planes both being parallel to but disposed on opposite sides of the longitudinal axis of said guide system.

6. An apparatus for processing a plurality of physically identical, uniquely coded data bearing sheets comprising, a guide system along which sheets may be transported, said guide system including a plurality of rails at least some of which are disposed in different planes which are parallel to the longitudinal axis of said guide system, and means for establishing a fluid pressure gradient along said guide system whereby to transport said sheets in a direction determined by said fluid pressure gradient.

7. A data processing apparatus for processing a plurality of physically identical uniquely coded data bearing sheets having notches in opposite edges thereof for engagement with a plurality of guide rails comprising, a guide system along which said sheets may be transported, said guide system including at least one rail disposed in a first plane and at least one rail disposed in a second plane, and first and second planes both being parallel to but disposed on opposite sides of the longitudinal axis of said guide system, and means for establishing a fluid pressure gradient along said guide system whereby to transport said sheets in a direction determined by said fluid pressure gradient.

References Cited in the file of this patent

UNITED STATES PATENTS

| | | |
|---|---|---|
| 2,261,971 | Matthews | Nov. 11, 1941 |
| 2,645,480 | Long | July 14, 1953 |
| 2,669,354 | Perrin | Feb. 16, 1954 |
| 2,785,388 | McWhirter et al. | Mar. 12, 1957 |
| 2,848,163 | Serrel | Aug. 19, 1958 |
| 3,033,447 | Buegler | May 8, 1962 |
| 3,034,643 | Keller | May 15, 1962 |
| 3,037,695 | Dickinson | June 5, 1962 |
| 3,042,199 | Welchman et al. | July 3, 1962 |
| 3,044,693 | Flam | July 17, 1962 |
| 3,045,905 | Tarasuk | July 24, 1962 |

FOREIGN PATENTS

| | | |
|---|---|---|
| 465,386 | Canada | May 23, 1950 |